United States Patent
Sato et al.

(10) Patent No.: US 7,212,653 B2
(45) Date of Patent: May 1, 2007

(54) IMAGE PROCESSING SYSTEM FOR VEHICLE

(75) Inventors: Atsushi Sato, Saitama (JP); Toshihiro Mori, Chiba (JP)

(73) Assignee: Kabushikikaisha Equos Research, Tokyo (JP)

( * ) Notice: Subject to any disclaimer, the term of this patent is extended or adjusted under 35 U.S.C. 154(b) by 773 days.

(21) Appl. No.: 10/314,230

(22) Filed: Dec. 9, 2002

(65) Prior Publication Data

US 2003/0108222 A1 Jun. 12, 2003

(30) Foreign Application Priority Data

Dec. 12, 2001 (JP) .............................. 2001-379340
Dec. 28, 2001 (JP) .............................. 2001-400962

(51) Int. Cl.
*G06K 9/00* (2006.01)
(52) U.S. Cl. ............................ 382/104; 382/291; 701/1
(58) Field of Classification Search ................ 382/103, 382/104, 106, 107, 154, 168, 178, 203, 209, 382/232, 256, 274, 276, 286–302, 305; 701/301, 701/1; 702/141; 342/386; 348/148
See application file for complete search history.

(56) References Cited

U.S. PATENT DOCUMENTS

| | | | | |
|---|---|---|---|---|
| 6,370,475 | B1 * | 4/2002 | Breed et al. | 701/301 |
| 6,411,867 | B1 * | 6/2002 | Sakiyama et al. | 701/1 |
| 6,498,620 | B2 * | 12/2002 | Schofield et al. | 348/148 |
| 6,571,193 | B1 * | 5/2003 | Unuma et al. | 702/141 |
| 6,704,653 | B2 * | 3/2004 | Kuriya et al. | 701/301 |
| 6,720,920 | B2 * | 4/2004 | Breed et al. | 342/386 |
| 6,768,944 | B2 * | 7/2004 | Breed et al. | 701/301 |

* cited by examiner

*Primary Examiner*—Matthew C. Bella
*Assistant Examiner*—Seyed Azarian
(74) *Attorney, Agent, or Firm*—Bacon & Thomas, PLLC

(57) ABSTRACT

A camera for imaging the periphery of a vehicle is provided, images imaged by the camera are stored, and a processed image obtained by processing a past image which has been imaged before reaching a current position is overlaid on a part of a current image, which is currently imaged, being a blind spot region by being hidden by a car body or the like so that a combination image is created. A contour line symbolizing the car body is combined with the combination image and the image is displayed.

17 Claims, 21 Drawing Sheets

IMAGE BY2

IMAGE B   IMAGE BY2'

CAR BODY

IMAGE AX

CAR BODY

IMAGE AY1

CAR BODY

IMAGE A'

IMAGE A' + B'

F I G. 2 0
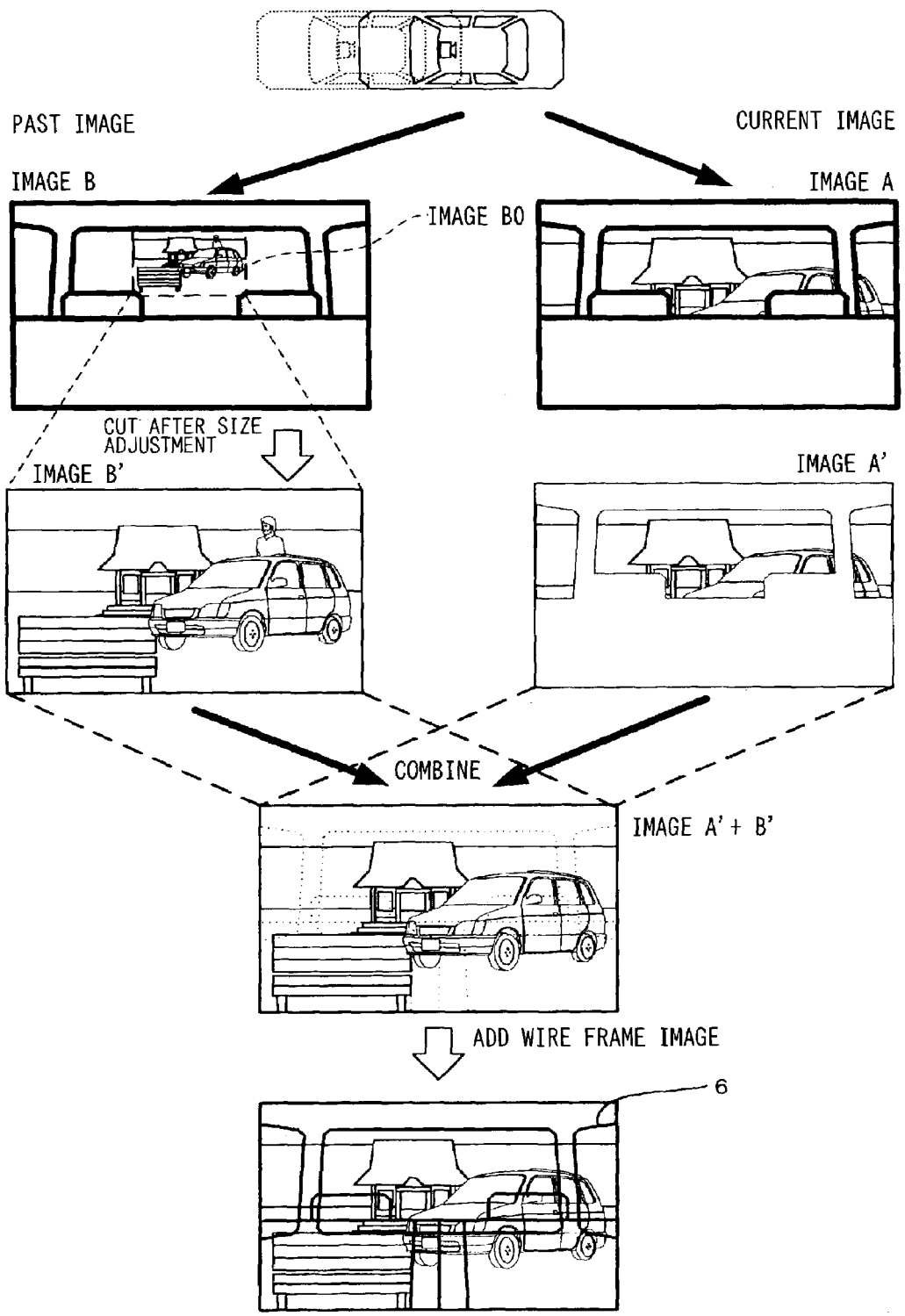

F I G. 2 4
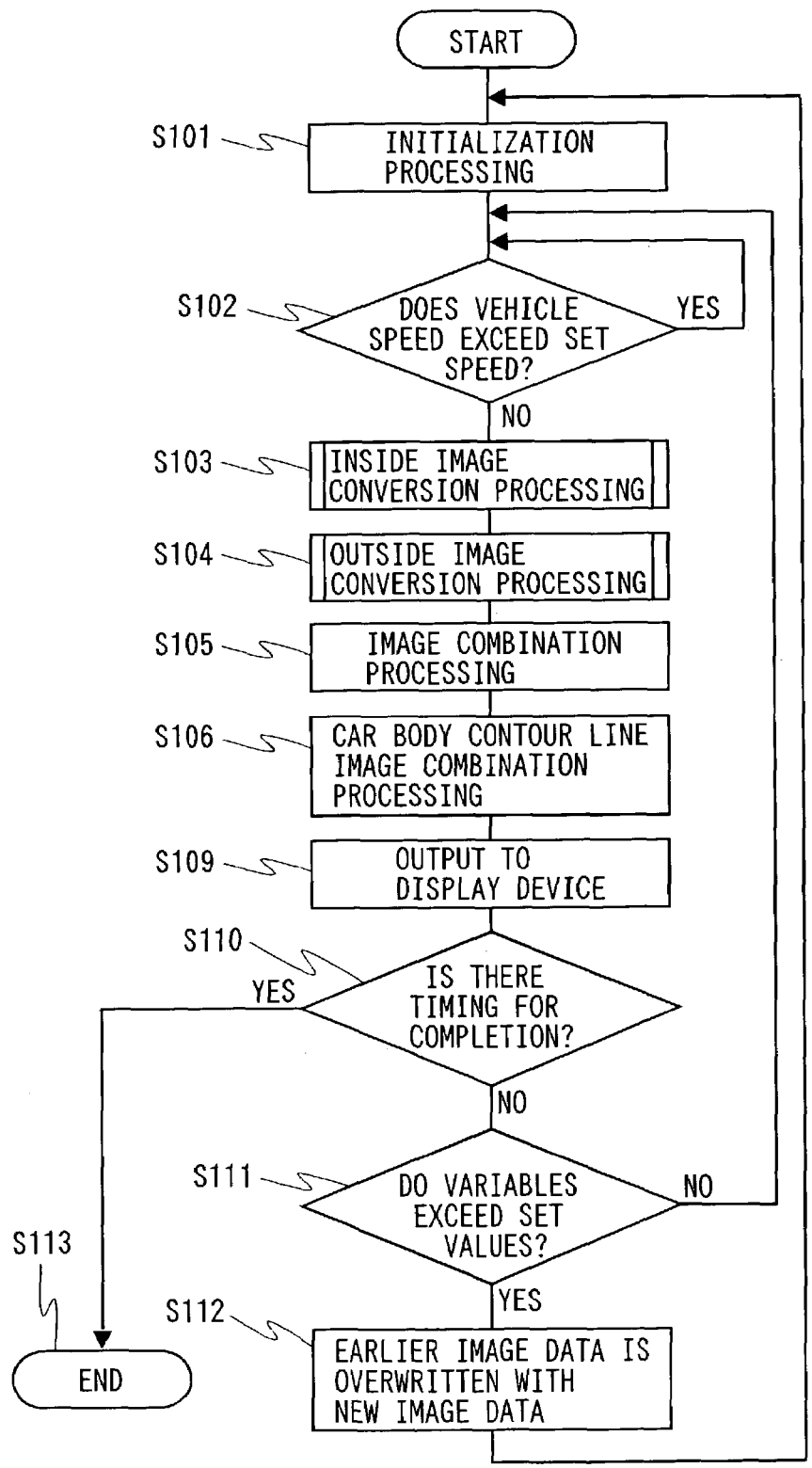

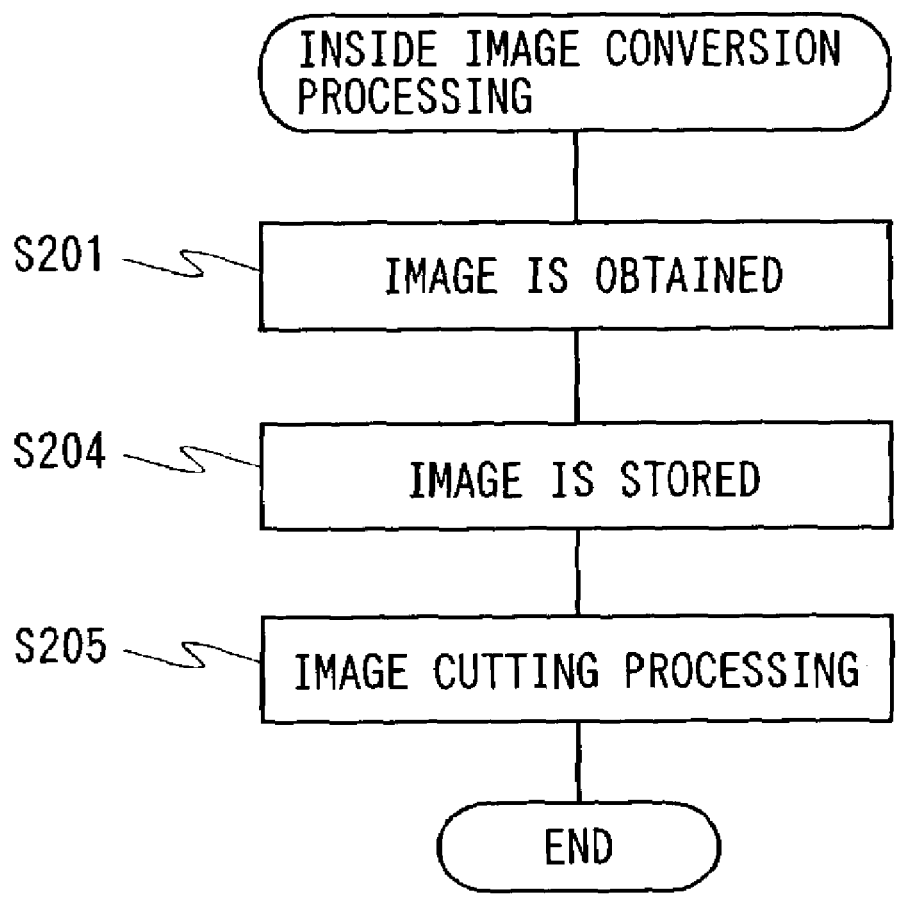

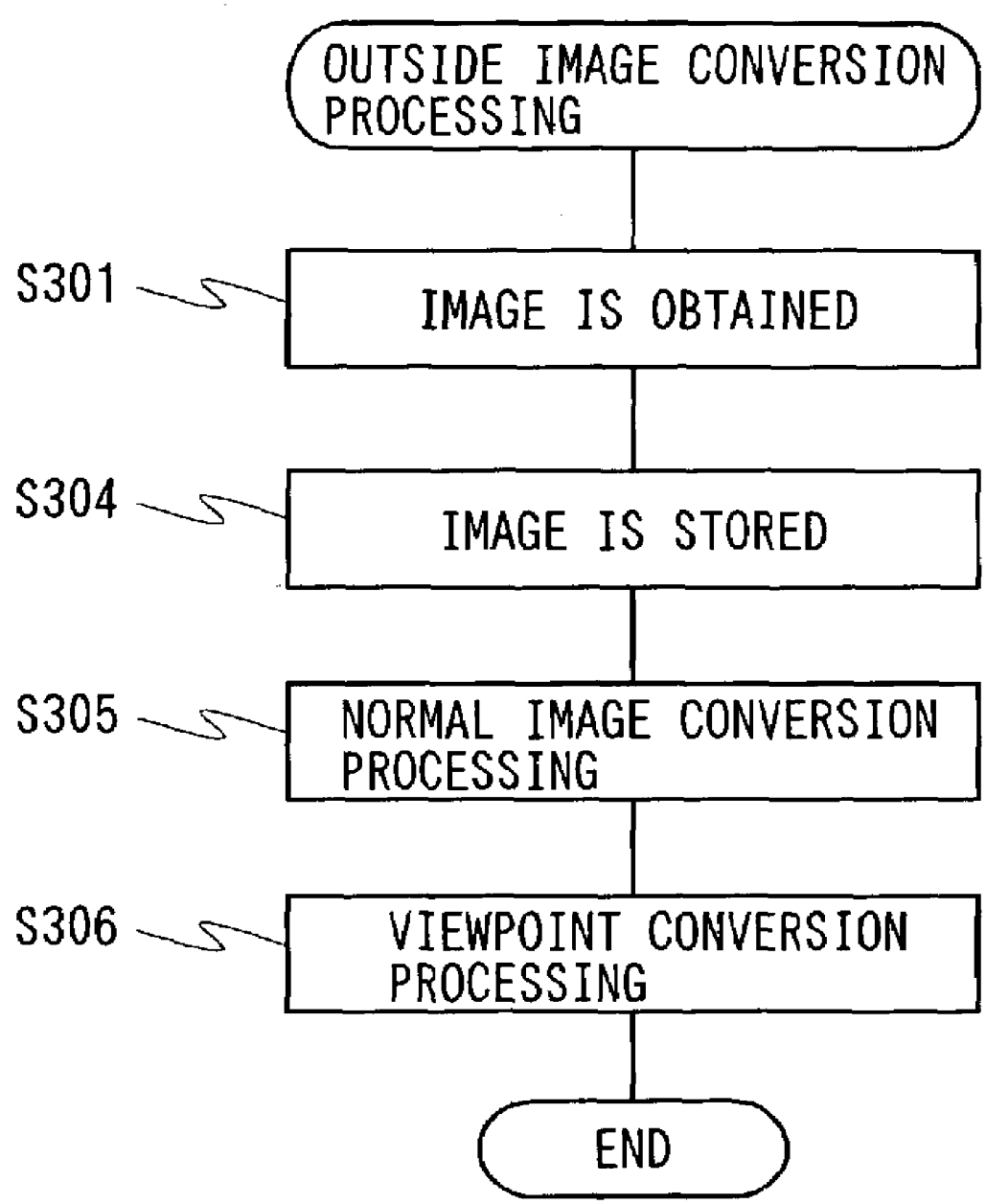

F I G. 2 7
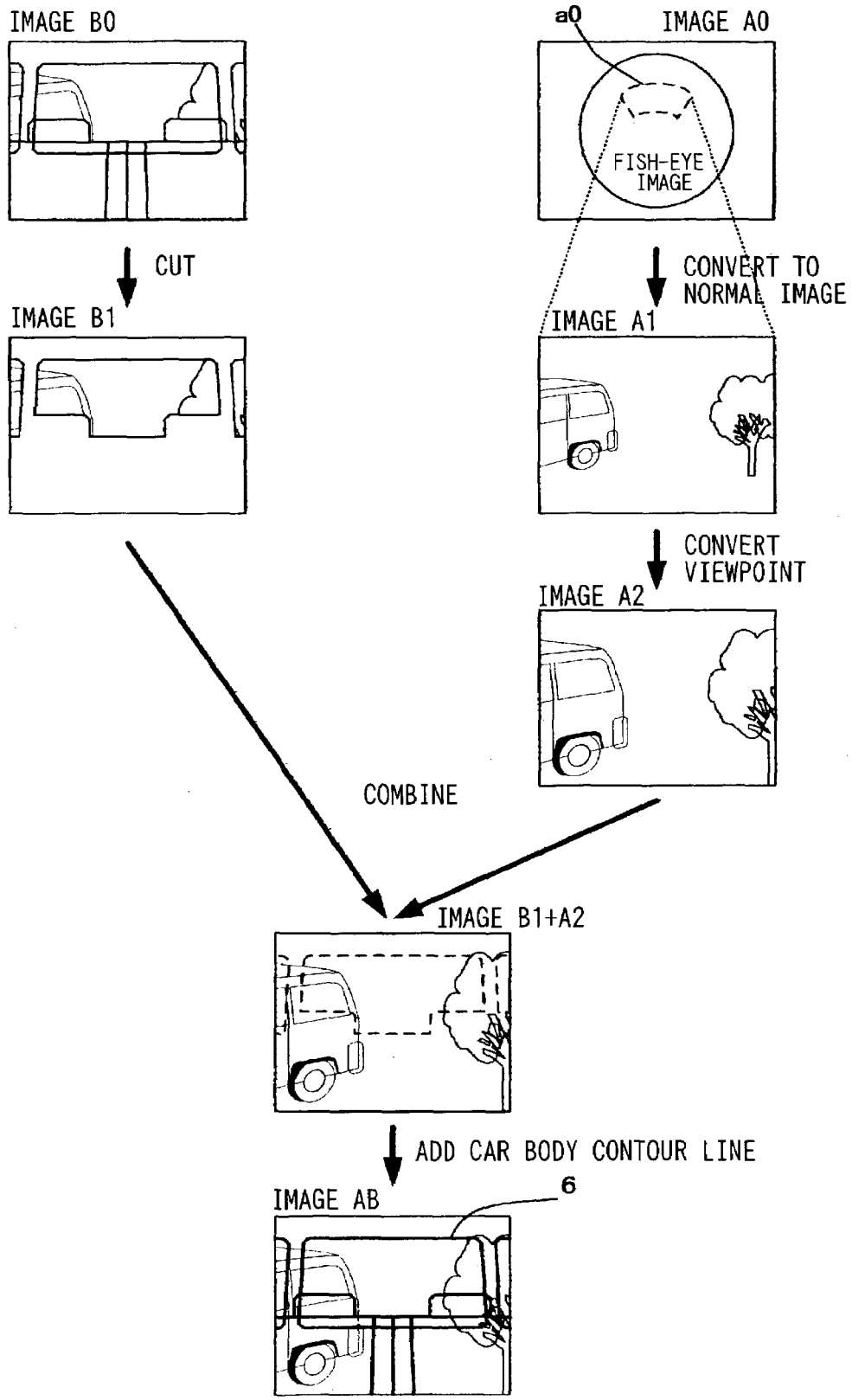

IMAGE PROCESSING SYSTEM FOR VEHICLE

BACKGROUND OF THE INVENTION

1. Field of the Invention

The present invention relates to an image processing system for a vehicle and, more particularly, to an image processing system for generating an image which displays a blind spot for a driver.

2. Description of the Related Art

When a driver drives and operates a vehicle, there exists a blind spot which is obstructed by a car body and the like and cannot be seen in the sight which can be recognized from the viewpoint of the driver sitting in a driver's seat. The vehicle is structured in a manner that such a blind spot can be recognized with an inside mirror, an outside mirror, and the like to some extent. Further, a vehicle has been recently proposed which has the structure in which a camera for imaging the outside of the vehicle is mounted and an image obtained by the camera is displayed on an interior monitor. For example, a camera for imaging the rear of the vehicle is mounted and a part being the blind spot in the rear is displayed on the interior monitor when the vehicle rolls backward, which helps the driver to check the rear in parking the vehicle in a garage or the like.

Furthermore, a device for displaying an image in a direction according to the sight of the driver is described in Japanese Patent Laid-open No. Hei 10-264723.

On the other hand, in a previous case when the driver operates the vehicle in which the periphery of the vehicle cannot be recognized with the camera image and the like, the driver was to understand intuitively the extent of relative positions of and distance between an outer obstacle and the vehicle from the outer obstacle coming into the sight and the interior scenery simultaneously within the sight (such as a window frame and a contour line of a trunk room).

However, in the device which displays the camera image as in the conventional art, an image imaged by the camera is displayed on the monitor as it is, and therefore the image displayed on the monitor is different from an image seen by eyes of the driver. The reasons are that a viewpoint position of the camera is different from a viewpoint position of the driver when he/she operates the vehicle, that the size of the obstacle which can be understood by the eyes and the size of the obstacle displayed on the monitor are different, and so on. Further, another reason is that only the outside scenery is imaged in the image while, in the previous case, the driver has simultaneously recognized the scenery outside the vehicle and a part of the vehicle (such as the window frame and a hood) which come into the sight and understood their relative positions intuitively.

In other words, there is a problem that the conventional monitor image is difficult for the driver, who has previously had a perception of distance by intuition, to understand the relationship in position between an outline of the vehicle and peripheral objects based on the intuition which he/she has previously mastered.

SUMMARY OF THE INVENTION

It is an object of the present invention to provide a combined image for a blind spot region around a vehicle so as to reduce anxiety about the blind spot, and to generate an image imaged at a position closer to the viewpoint of a driver so as to enable the driver to easily understand the relationship in position between the vehicle and peripheral obstacles through the image.

The object as described above is achieved by the following present invention.

(1) An image processing system for a vehicle, comprising:

an imaging means for imaging images in a moving direction of the vehicle;

a car body region specifying means for specifying a car body region hidden by a car body part in an image imaged by the imaging means;

a car body image region obtaining means for obtaining an image region corresponding to the car body region which is assumed to be seen if the car body part were transparent;

an image creating means for creating an image by replacing the car body region in the image imaged by the imaging means with the image region obtained by the car body image region obtaining means; and a display means for displaying the image created by the image creating means.

(2) The image processing system for the vehicle according to the above (1), in which an image region previously imaged by the imaging means is used as the image region which is assumed to be seen if the car body part were transparent.

(3) The image processing system for the vehicle according to the above (1), further comprising: a vehicle speed detecting means for detecting the vehicle speed of the vehicle, in which the image created by the image creating means is displayed when the vehicle speed detected by the vehicle speed detecting means is equal to or lower than a predetermined vehicle speed (4) The image processing system for the vehicle according to the above (1), further comprising: a moving distance detecting means for detecting the moving distance of the vehicle, in which the car body image region obtaining means obtains the image region corresponding to the car body region when the detected distance is equal to or longer than a predetermined distance.

(5) The image processing system for the vehicle according to the above (4), further comprising: a car body data storage means for storing car body data of the vehicle, in which the predetermined distance is determined based on the data stored in the car body data storage means.

(6) The image processing system for the vehicle according to the above (1), further comprising: a car body data storage means for storing car body data, in which the car body region specifying means specifies the car body region hidden by the car body part based on the car body data.

(7) The image processing system for the vehicle according to the above (1), further comprising: a car body form image combination means for creating a combination image by further adding a contour line of a car body form including at least one of a car body, a bumper, a light, a wiper, an instrument panel, a steering wheel, a mirror, a tire, a seat, and a form of a window to an image created by the image creating means.

(8) An image processing system for a vehicle, comprising:

an imaging means for imaging images in a moving direction of the vehicle;

an imaged image converting means for converting the viewpoint of an imaged image as if it were an image seen from the driver's viewpoint;

a car body region specifying means for specifying a car body region hidden by a car body part in the image imaged by the imaging means;

a car body image region obtaining means for obtaining an image region corresponding to the car body region which is assumed to be seen if the car body part were transparent;

an image creating means for creating an image by replacing the car body region part in the image whose viewpoint has been converted by the imaged image converting means with the image region obtained by the car body image region obtaining means whose viewpoint has been converted by the imaged image converting means; and a display means for displaying the image created by the image creating means.

(9) The image processing system for the vehicle according to the above (8), in which an image region previously imaged by the imaging means is used as the image region which is assumed to be seen if the car body part were transparent.

(10) The image processing system for the vehicle according to the above (8), further comprising: a vehicle speed detecting means for detecting the vehicle speed of the vehicle, in which the image created by the image creating means is displayed when the vehicle speed detected by the vehicle speed detecting means is equal to or lower than a predetermined vehicle speed.

(11) The image processing system for the vehicle according to the above (8), further comprising: a moving distance detecting means for detecting the moving distance of the vehicle, in which the imaged image converting means converts the viewpoint of the image when the moving distance detecting means detects that the vehicle has moved from a position of a driver to a position in which the imaging means is installed.

(12) The image processing system for the vehicle according to the above (8), further comprising: a moving distance detecting means for detecting the moving distance of the vehicle, in which the car body region specifying means specifies the car body region when the detected distance is equal to or longer than a predetermined distance.

(13) The image processing system for the vehicle according to the above (12), further comprising: a car body data storage means for storing car body data of the vehicle, in which the predetermined distance is determined based on the data stored in the car body data storage means.

(14) The image processing system for the vehicle according to the above (8), further comprising: a car body data storage means for storing car body data of the vehicle, in which the car body region specifying means specifies the car body region hidden by the car body part based on the car body data.

(15) The image processing system for the vehicle according to the above (8), further comprising: a car body form image combination means for creating a combination image by further adding a contour line of a car body form including at least one of a car body, a bumper, a light, a wiper, an instrument panel, a steering wheel, a mirror, a tire, a seat, and a form of a window to the image created by the image creating means.

(16) The image processing system for the vehicle according to the above (1), further comprising: a different imaging means arranged outside the vehicle, for imaging images in the same direction as the imaging means, in which an image imaged by the different imaging means is used as the image assumed to be seen if the car body part were transparent.

(17) The image processing system for the vehicle according to the above (16), in which the image imaged by the different imaging means is conversion-processed to an image seen from a position of the driver's viewpoint.

(18) The image processing system for the vehicle according to the above (16), in which the image imaged by the imaging means is conversion-processed to an image seen from a position of the driver's viewpoint.

(19) The image processing system for the vehicle according to the above (16), further comprising: a vehicle speed detecting means for detecting the vehicle speed, in which the image created by the image creating means is displayed when the vehicle speed detected by the vehicle speed detecting means is equal to or lower than a predetermined vehicle speed.

BRIEF DESCRIPTION OF THE DRAWINGS

FIG. 20 is a flow diagram showing a procedure of another image processing;

FIG. 24 is a flow chart showing the operation of the image processing system in the second embodiment of the present invention;

FIG. 25 is a flow chart showing the operation of the image processing system in the second embodiment of the present invention;

FIG. 26 is a flow chart showing the operation of the image processing system in the second embodiment of the present invention;

FIG. 27 is a flow diagram showing a procedure of image processing; and

DETAILED DESCRIPTION OF THE PREFERRED EMBODIMENT(S)

(First Embodiment of the Invention)

Hereinafter a first embodiment of the present invention will be explained in detail with reference to the attached drawings.

Figure 1:
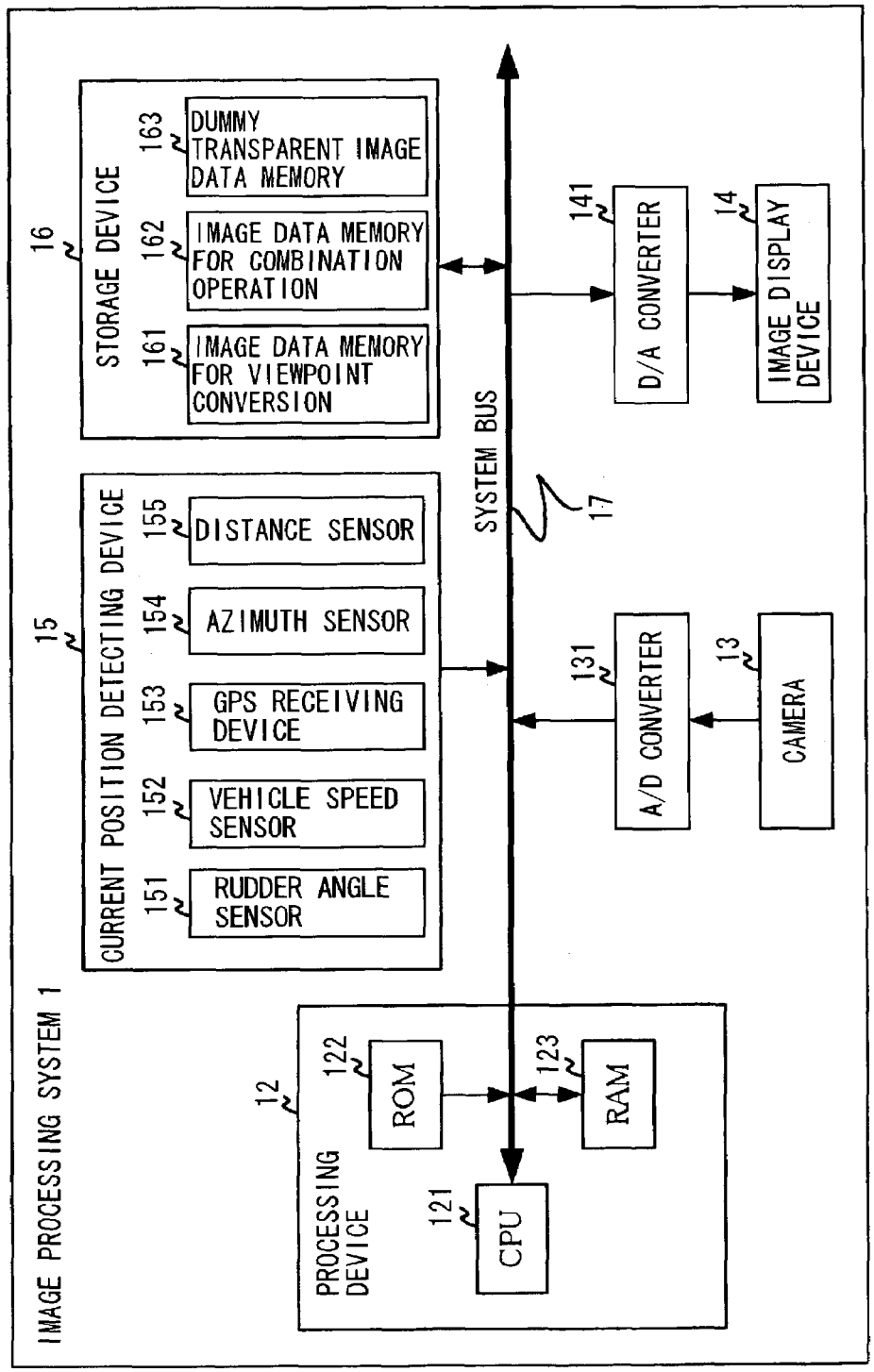
FIG. 1 is a block diagram showing a configuration of an image processing system in a first embodiment of the present invention.

FIG. 1 is a block diagram showing a configuration of an image processing system 1 in the first embodiment of the present invention. The image processing system 1 has a processing device 12 for performing image processing, a camera 13 as an imaging means mounted on a car body, an image display device 14 as a display means for displaying an image, a current position detecting device 15, and a storage device 16 as an image storage means, and these devices are connected to each other via a system bus 17.

The camera 13 is provided, for example, in a motor vehicle and mounted in a position of the same height as that of a viewpoint position of a driver. In this embodiment, the camera 13 is arranged in a position where a rear-view mirror is mounted. The camera 13 is connected to the system bus 17 via an A/D converter 131. An image signal outputted from the camera 13 is converted to a digital signal by the A/D converter 131. When the connected camera 13 is capable of outputting the digital signal, the A/D converter is not needed. The camera 13 includes a camera arranged toward the front of the vehicle and a camera arranged toward the rear of the vehicle. In the explanations below, the camera 13 installed in the rear will be explained as an example, which is used in moving backward when the sight is limited maximally.

The current position detecting device 15 has a rudder angle sensor 151, a vehicle speed sensor 152, a GPS receiving device 153, an azimuth sensor 154, and a distance sensor 155. The rudder angle sensor 151 detects a steering angle of the vehicle. The steering angle is obtained by detecting a rotation angle of a steering wheel or an angle of front wheels. The vehicle speed sensor 152 as a vehicle speed detecting means detects a traveling speed of the vehicle. The traveling speed is also detected when the vehicle is rolled backward. The GPS receiving device 153 detects an absolute position of the vehicle. The azimuth sensor 154 detects an orientation of the vehicle. The distance sensor 155 as a moving distance detecting means detects the moving distance of the vehicle. The moving distance of the vehicle can be obtained by the various sensors explained above. Specifically, the moving distance can be detected by the distance sensor 155. The moving distance can be also detected by the vehicle speed and time detected by the vehicle speed sensor 152. Further, the moving distance can be detected by a trail of positions detected by the GPS receiving device 153. Moreover, when the orientation of the vehicle is changed, the moving distance can be detected more precisely by the rudder angle sensor 151, the azimuth sensor 154, and the distance sensor 155 or the vehicle speed sensor 152.

The storage device 16 is a device for storing images imaged by the camera 13, and has an image data memory 161 for viewpoint conversion in which the images outputted from the camera 13 are continuously stored, an image data memory 162 for combination operation, and a dummy transparent image data memory 163.

The image display device 14 is constituted, for example, of a liquid crystal display or the like, on which a dummy transparent image stored in the dummy transparent image data memory 163 is displayed. Data transmitted to the image display device 14 is converted to an analog signal via a D/A converter 141. When the image display device 14 is capable of receiving a digital signal, the D/A converter is not needed.

The processing device 12 has a central processing unit (CPU) 121, a read-only memory (ROM) 122, and a random-access memory (RAM) 123. The CPU 121 obtains information on the moving distance and the orientation of the vehicle obtained by the current position detecting device 15, and obtains image data for viewpoint conversion and image data for combination operation from the storage device 16 so as to generate dummy transparent image data from these data.

The ROM 122 stores therein, for example, software for the CPU 121 to perform image processing and car body data such as image data of a contour line of the vehicle, and also functions as a car body data storage means. The RAM 123 is used, for example, as a working area.

Figure 2:
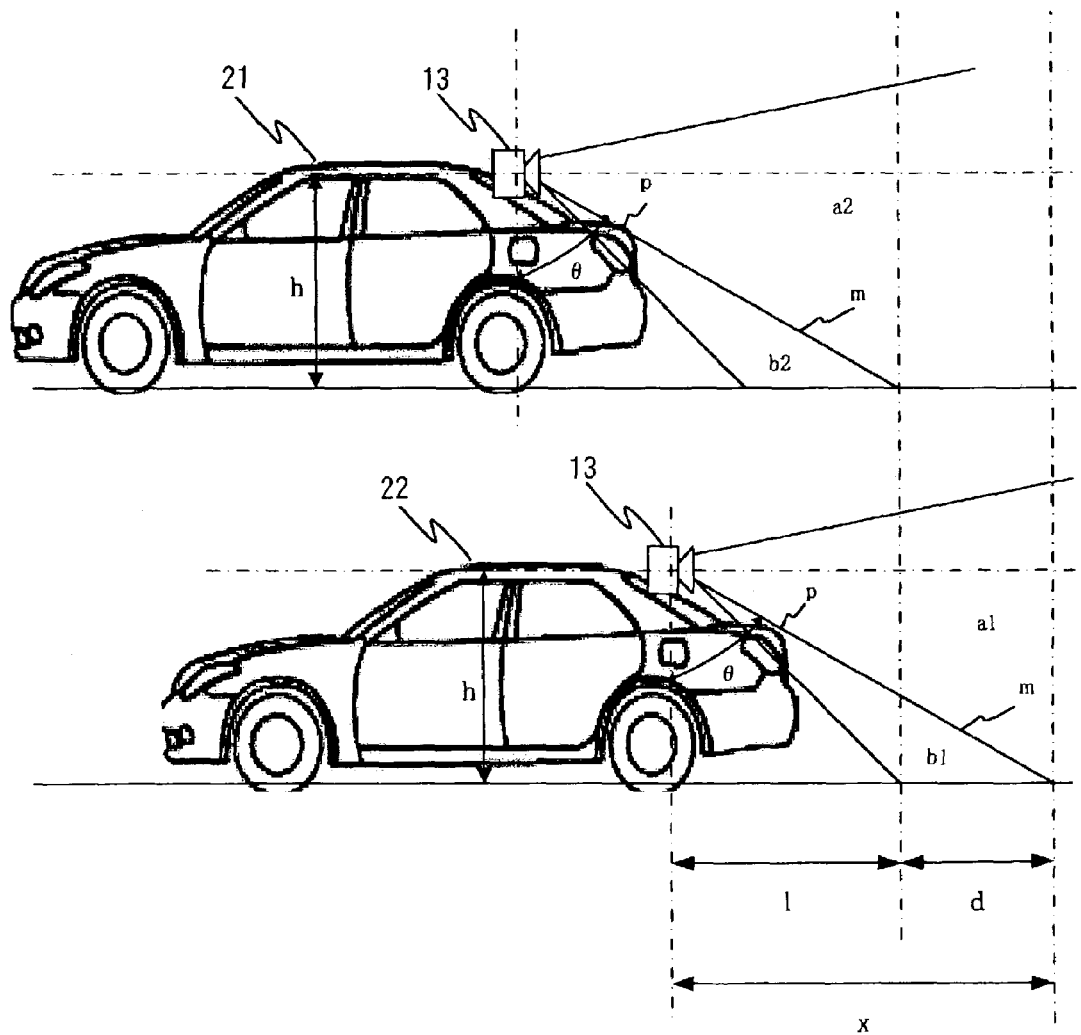
FIG. 2 is a side view of a vehicle on which the image processing system in the first embodiment of the present invention is mounted.

The image processing system of the present invention operates as follows. FIG. 2 is a general side view of a vehicle 22 on which the image processing system of the present invention is mounted. The camera 13 for imaging the rear of the vehicle is arranged in the vehicle (for simplifying the explanations, the camera 13 is provided outside the vehicle in FIG. 2) and a rear part of the vehicle is displayed in a part of a screen thereof, where a blind spot region b1 exists and a visible region a1 is actually displayed on the screen.

The blind spot region b1 is a region which has been displayed in a visible region a2 when the vehicle is in a position before rolling backward (a vehicle 21). Thus, as an image of the region b1 which is contained in a blind spot in a current position (the vehicle 22), an image before reaching the current position, that is, an image imaged when the vehicle was positioned forward from the current position (the vehicle 21) (a past imaged image) is used to generate the image of the blind spot region part b1.

Then, the generated image of the blind spot part b1 is pasted on (combined with) a blind spot part of the image which is currently displayed so that an entire camera image is displayed as if the blind spot region b1 part were also imaged in it.

The most preferable position of installing the camera 13 is the viewpoint position of the driver, but the camera 13 may be installed in a position near the viewpoint position. For example, besides the position at the rear-view mirror, a position near the center of a dashboard, a shoulder part of a seat, a position near the center of a rear window, and the like are possible.

Figure 3:
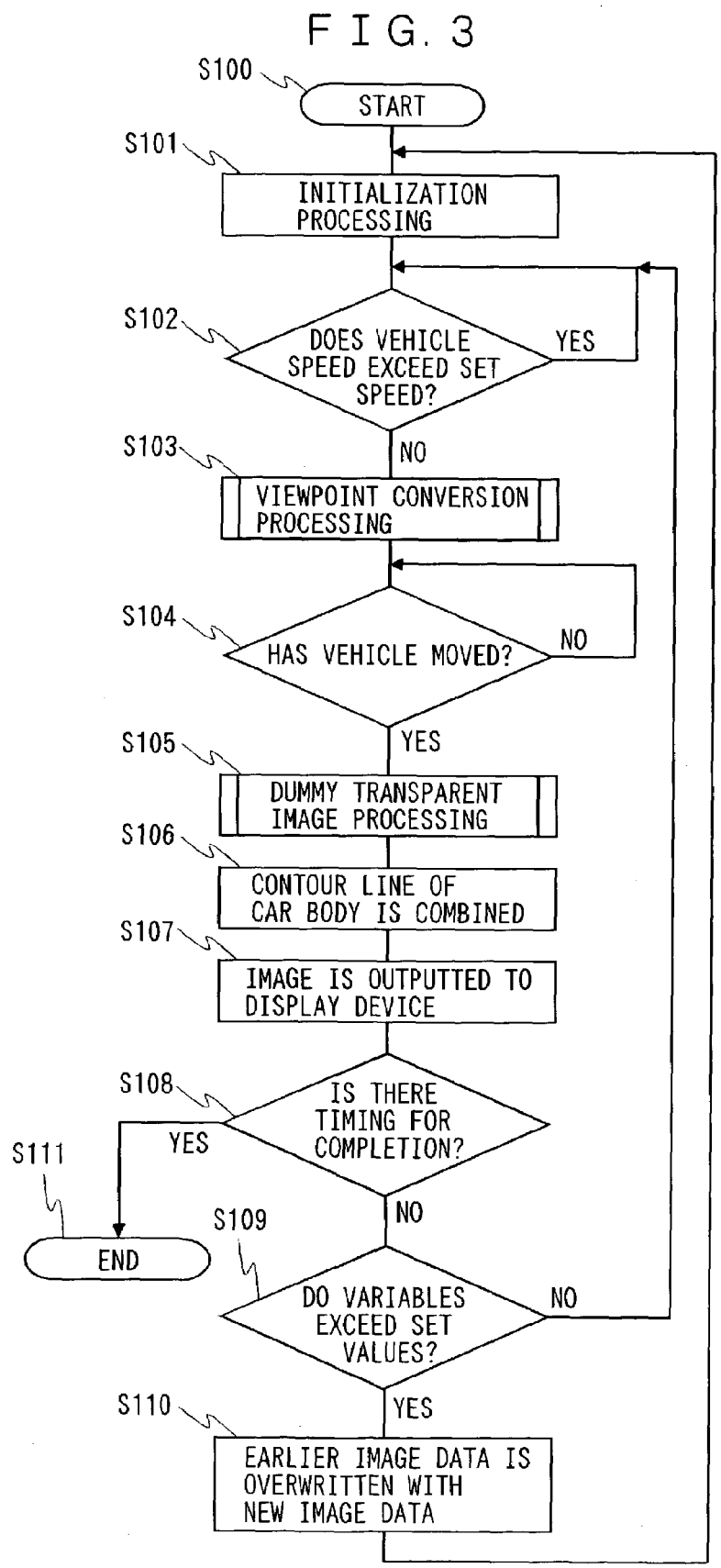
FIG. 3 is a flow chart showing the operation of the image processing system in the first embodiment of the present invention.
Figure 4:
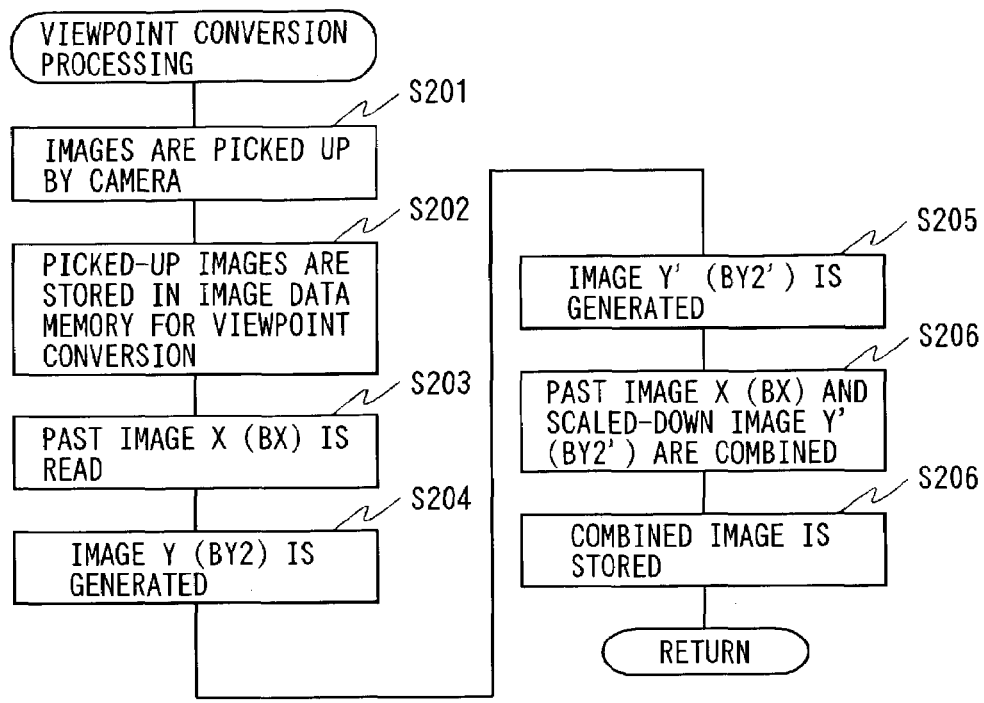
FIG. 4 is a flow chart showing the operation of the image processing system in the first embodiment of the present invention.
Figure 5:
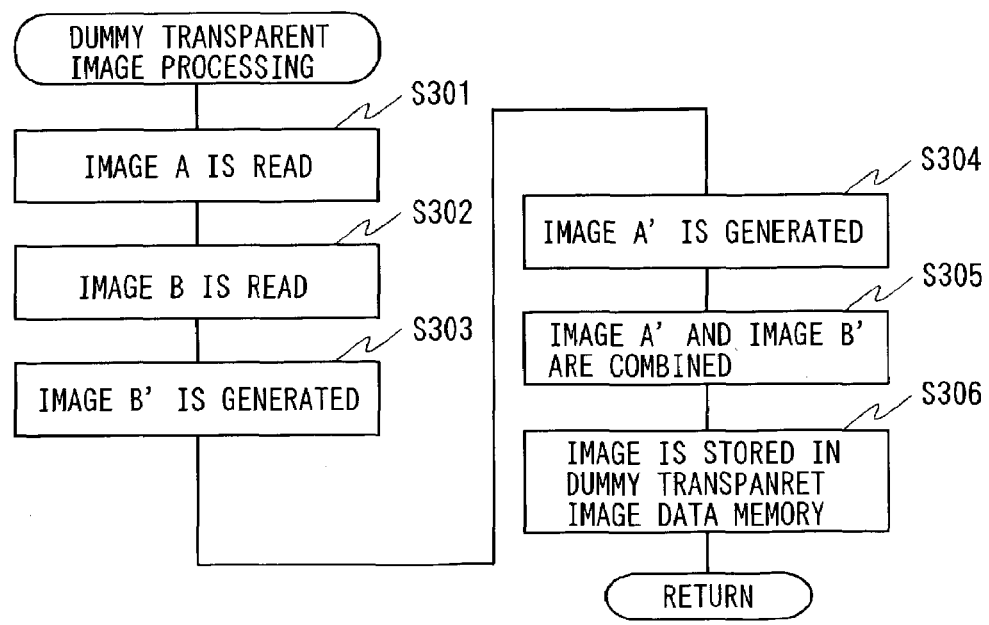
FIG. 5 is a flow chart showing the operation of the image processing system in the first embodiment of the present invention.

The operation of the image processing system 1 of the present invention as configured above will be explained. FIG. 3, FIG. 4, and FIG. 5 are flow charts showing the operation of the processing device 12.

A power supply switch is turned on by the ON-operation of an ignition switch (step S100). Other than this timing, the switch may also be turned on at the timing when a shift lever is set in a D position, or in an R position in a case of displaying a rear image in rolling backward.

Next, data stored in the storage device 16 is searched so that image data and the like can be written in a storage region, and if there is no storable region, preparation for enabling data, which will be next obtained, to be overwritten is made as well as preparation for writing data is made such as erasing data which will not be used in the future, and so on, with reference to the distance, time, and the like stored together with the image data (step S101). For example, variables and the like for monitoring set values which are for judging whether data of the images stored in the image data memory 161 for viewpoint conversion and the like is to be updated are initialized.

Subsequently, it is judged whether the vehicle speed exceeds a predetermined set speed (step S102). Since the image processing system is used for recognizing the periphery of the vehicle in this embodiment, that is, it is used in moving the vehicle sideways, in parking the vehicle in a garage, and the like, it is judged that the image processing is not needed when the vehicle speed is high. Therefore, when the vehicle speed exceeds the set speed, the system returns to step S102 again. This set speed may be changeable as necessary. When the vehicle speed does not exceed the set speed, it is judged that image processing is needed and the system goes to the next step in order to perform the image processing.

Figure 6:
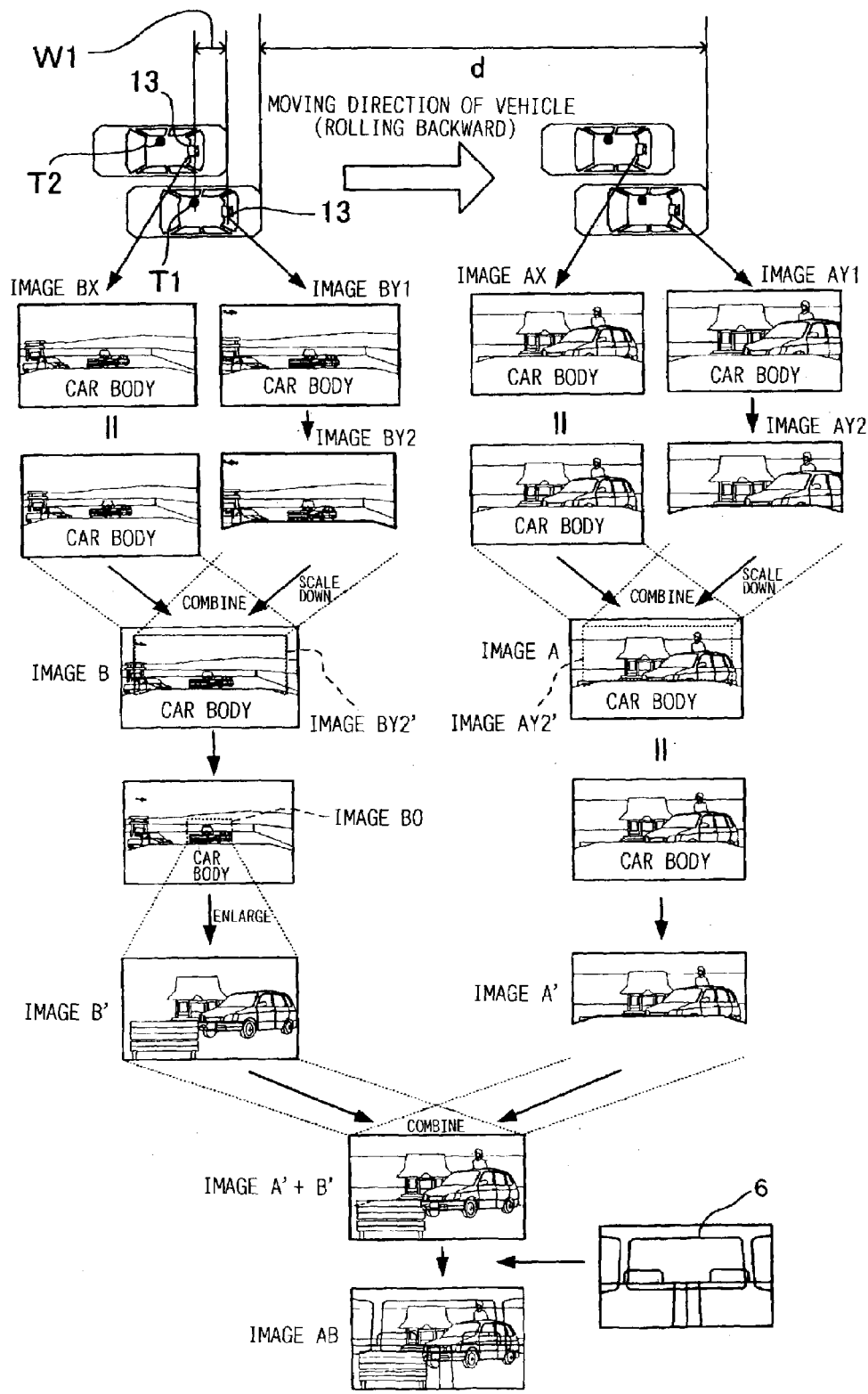
FIG. 6 is a flow diagram showing a procedure of image processing.
Figure 7:
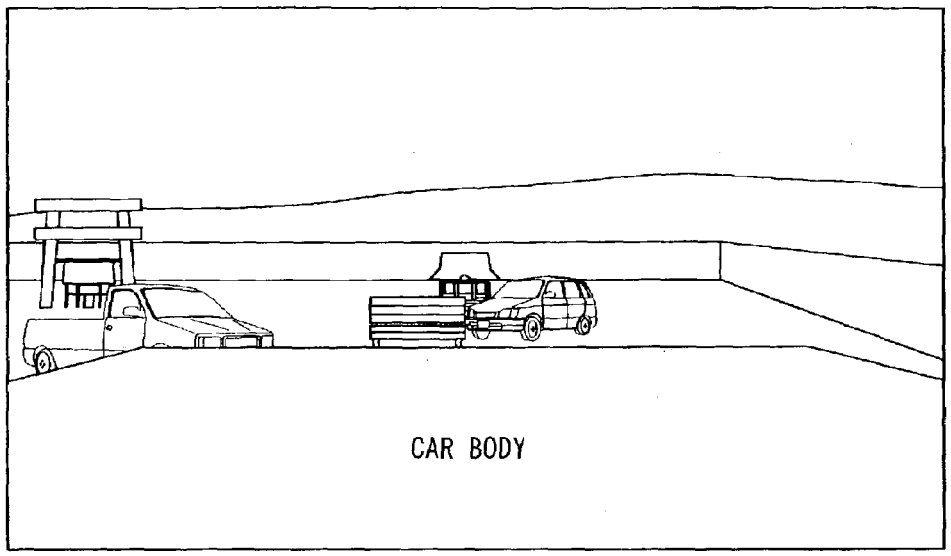
FIG. 7 is an enlarged view of a processed image shown in FIG. 6.
Figure 8:
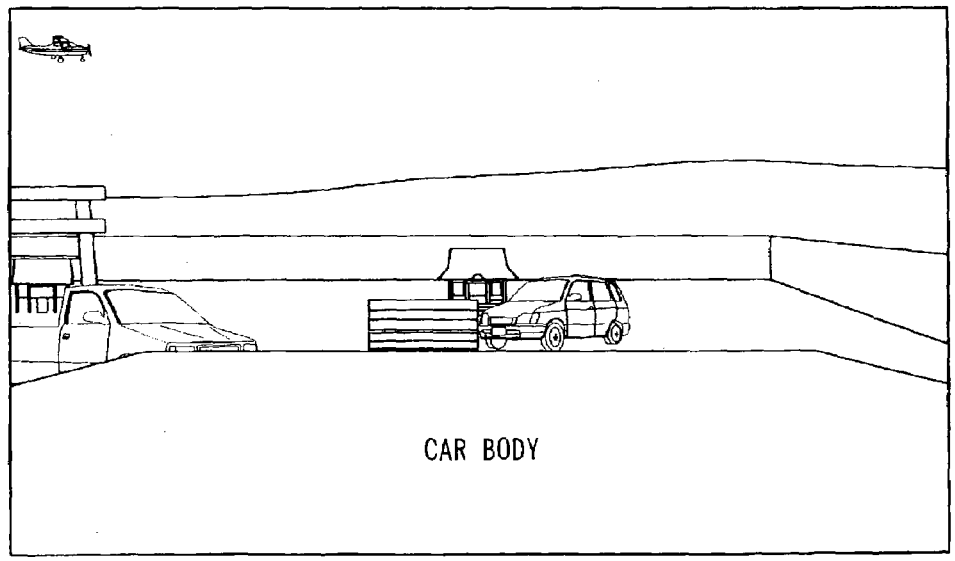
FIG. 8 is an enlarged view of a processed image shown in FIG. 6.
Figure 9:
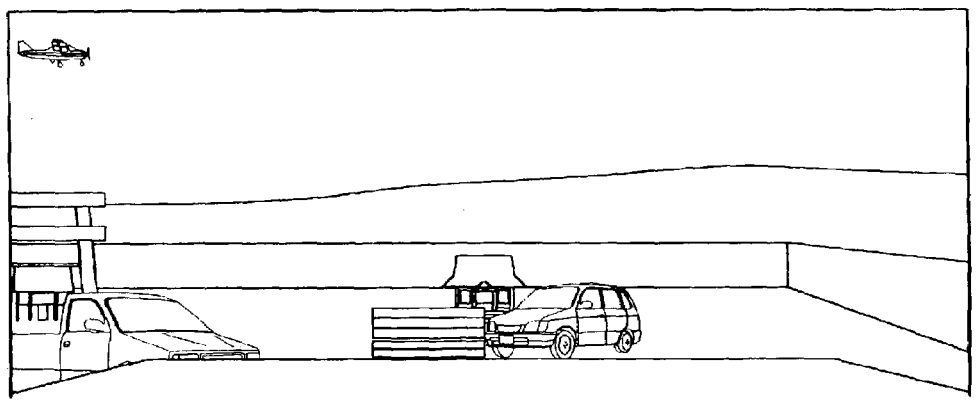
FIG. 9 is an enlarged view of a processed image shown in FIG. 6.
Figure 10:
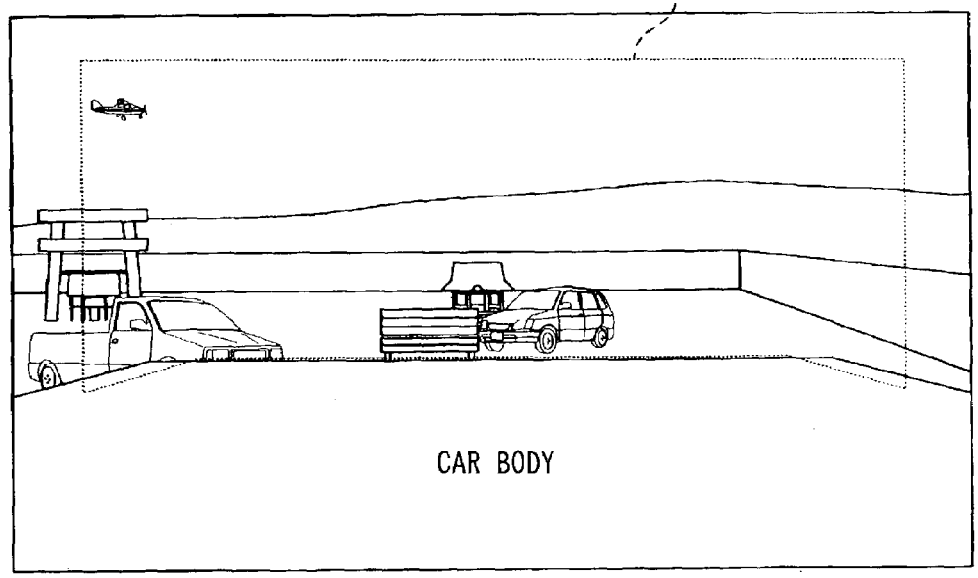
FIG. 10 is an enlarged view of a processed image shown in FIG. 6.
Figure 11:
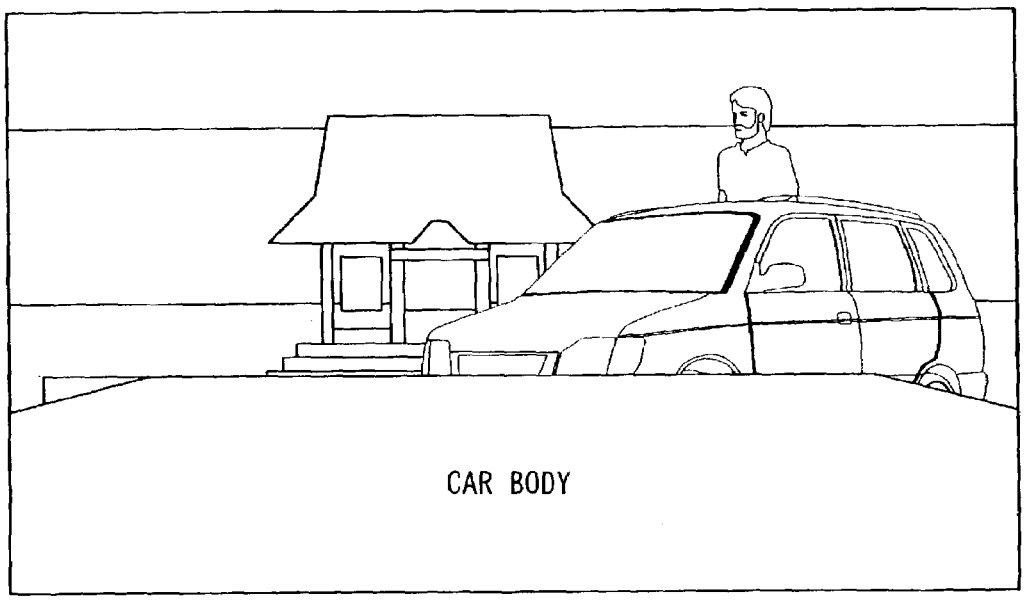
FIG. 11 is an enlarged view of a processed image shown in FIG. 6.
Figure 12:
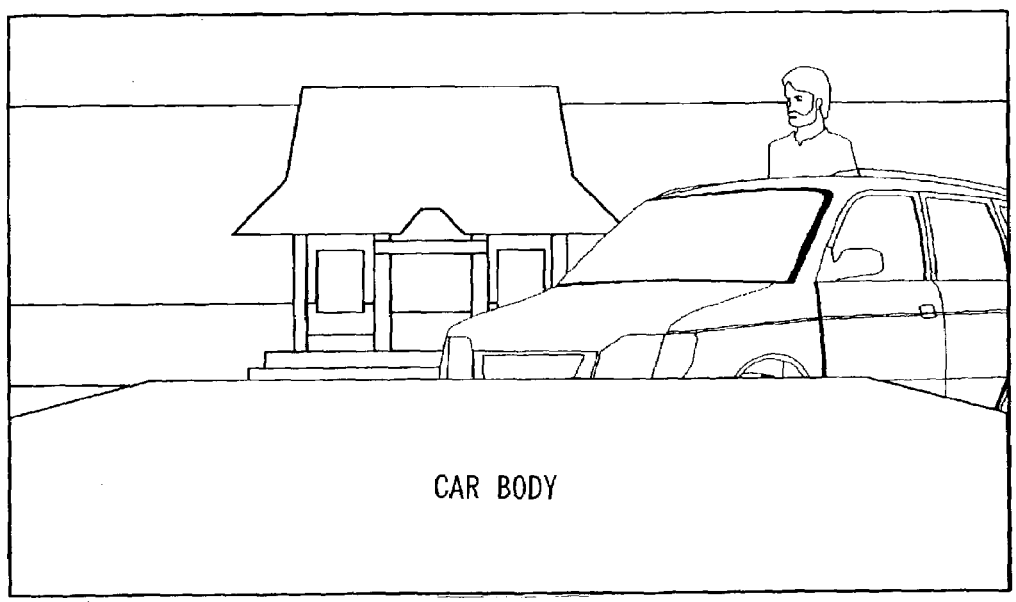
FIG. 12 is an enlarged view of a processed image shown in FIG. 6.

FIG. 6 is a flow diagram showing a procedure of the image processing, and FIG. 7 to FIG. 19 are enlarged views of respective views shown in FIG. 6.

FIG. 4 is a flow chart showing processing contents of viewpoint conversion processing (step S103). This processing is processing for correcting the image imaged by the camera 13 to an image expected to be displayed when imaged by the camera at the viewpoint position of the driver. In this processing, when the viewpoint position of the driver and an imaging position of the camera 13 are apart by distance W1 in a moving direction of the vehicle, the camera 13 has previously passed a viewpoint position T1, and therefore an image at the passing instant is considered as an image of the viewpoint position so as to scale down and correct the camera image relative to the image of the viewpoint position. In other words, a current image obtaining means for obtaining the image at the current moment, a viewpoint position image obtaining means for obtaining the camera image at the instant when the camera has passed the current viewpoint position of the driver, and a correcting means for correcting the current image obtained by the current image obtaining means for the viewpoint position image are included.

Specifically, the following processing is performed. The images imaged by the camera 13 (step S201) are continuously stored in the image data memory 161 for viewpoint conversion of the storage device 16 (step S202). The distance W1 from the current camera position to the driver's seat (a viewpoint position when the driver looks backward) is calculated from the car body data stored in the ROM 122 and, when a past image imaged at a position corresponding to the calculated distance W1 (a position moved forward by the distance W1) is defined as an image BX (FIG. 7), the image BX is read from the image data memory 161 for viewpoint conversion (step S203). The step S203 constitutes the viewpoint position image obtaining means.

A car body part in an image BY1 which is currently obtained (FIG. 8) is detected to generate an image BY2 from which the car body part is removed (step S204). The step S204 constitutes the current image obtaining means. At this time, as a means for detecting the car body part, judgment is made from the data of the car body, to which the system of the present invention is installed, stored in the ROM 122. The car body data includes three-dimension data of the car body, distance to each part of the vehicle, length of the parts, and the like. Since the read image BX is the same as the current sight of the driver, the image BY2 is scaled down relative to the image BX (step S205). A scaled-down image is defined as BY2' (FIG. 10), and the image BX and the image BY2' are combined to generate an image B (FIG. 10) (step S206). The steps S205 and S206 constitute the correcting means.

By the processing from step S201 to step S206 as described above, the image B seen from the viewpoint position of the driver is generated. Then, the image B combined in step S206 is stored in the image data memory 162 for combination operation (step S207). The viewpoint conversion processing step S103 constitutes an imaged image converting means. Such viewpoint conversion processing (step S103) is continuously performed for the images imaged by the camera 13, and the images corrected to the viewpoint position are stored continuously in time in the image data memory 162 for combination operation. After step S103, the system goes to the next step.

It is judged whether the vehicle has moved from values detected by the various sensors stored in the current position detecting device 15 (step S104). For example, when the vehicle speed sensor 152 detects that the vehicle speed reaches or exceeds a fixed speed, it is judged that the vehicle has moved. Alternatively, when the distance sensor 155 detects that the moving distance reaches or exceeds a predetermined distance, it is judged that the vehicle has moved. If it is judged that the vehicle has not moved, step S104 is repeated.

As shown in FIG. 2, for example, the blind spot region b1 in a moving direction side is determined by the viewpoint position of the camera 13 and a contour position p of the hood, and a range of the blind spot region is determined if the position of installing the camera 13 is determined. Specifically, as shown in FIG. 2, the range of the blind spot region is easily determined by the following formula from the height h from the camera 13 to the ground surface, an angle θ between a straight line m which links the viewpoint of the camera with a position where the sight is obstructed (the contour p of a rear trunk room) and a plumb line, the horizontal distance 1 from the camera 13 to a lower limit position of the sight of the camera 13, and the horizontal distance x from a point where the straight line m intersects the ground surface to the camera 13.

$$d = h \times \tan\theta - 1$$

Therefore, when the vehicle moves by at least the distance d, the image of the blind spot region b1 can be generated by a past image which is initially stored.

When it is judged that the vehicle has moved, a combination image needs to be newly generated because the image combined before moving cannot be used, and dummy transparent image processing is performed (step S105). The dummy transparent image processing will be explained below. FIG. 5 is a flow chart showing the dummy transparent image processing. Also for the current image, an image which has been conversion-processed to the image of the viewpoint position of the driver by the viewpoint conversion processing similarly to steps S201 to S207 is stored in the image data memory 162 for combination operation. Specifically, the distance W1 from the current camera position to the driver's seat is calculated from the car body data stored in the ROM 122 and, when a past image imaged at a position corresponding to the calculated distance W1 is defined as an image AX (FIG. 11), the image AX is read from the image data memory 161 for viewpoint conversion.

Figure 13:
FIG. 13 is an enlarged view of a processed image shown in FIG. 6.
Figure 14:
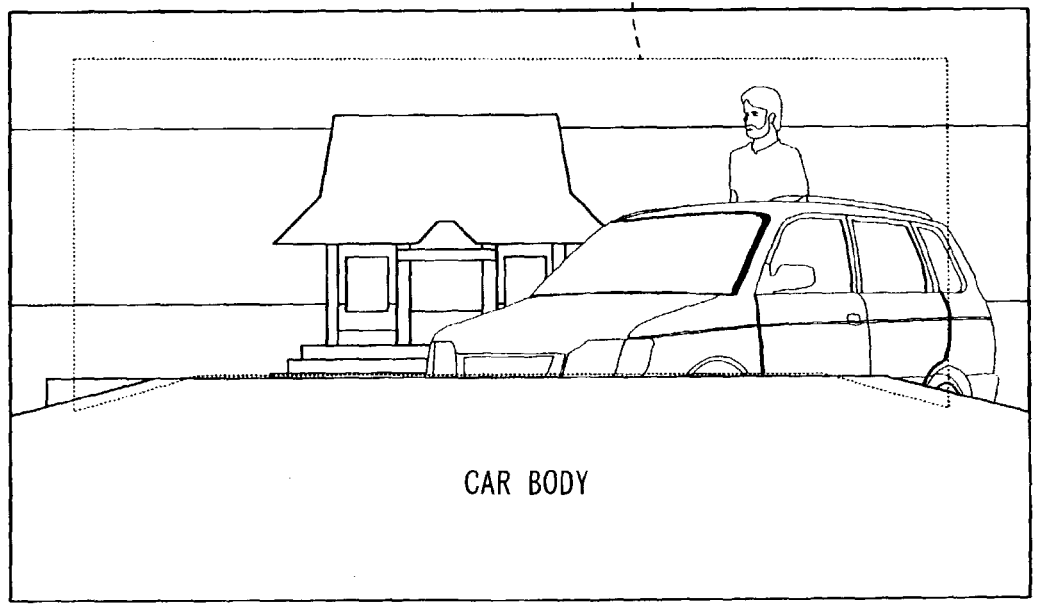
FIG. 14 is an enlarged view of a processing image shown in FIG. 6.

A car body part in an image AY1 which is currently obtained (FIG. 12) is detected to generate an image AY2 from which the car body part is removed (FIG. 13). Since the read image AX is the same as the current sight of the driver, the image AY2 is scaled down relative to the image AX and, when the image is defined as AY2' (FIG. 14), the image AX and the image AY2' are combined to generate an image A (FIG. 14). The image A is stored in the image data memory 162 for combination operation. The latest image A to which viewpoint conversion processing has been thus performed (the last image processed and generated in the viewpoint conversion processing) is read from the image data memory 162 for combination operation (step S301).

Subsequently, a moving amount is calculated and the image B capturing a blind spot of the image A, which corresponds to the calculated moving amount, is read from the image data memory 162 for combination operation (step S302). At this time, the moving amount is determined based on a moving amount inputted from the distance sensor 155. Besides this method, the moving amount may be obtained by integrating a vehicle speed value detected by the vehicle speed sensor 152 with respect to elapsed time. It may also be calculated from a moving trail of the absolute positions of the vehicle obtained by the GPS receiving device 153. As a method of selecting the image B, the image in a point forward from the current position by the distance d may be selected other than the method based on the moving amount as described above.

Figure 15:
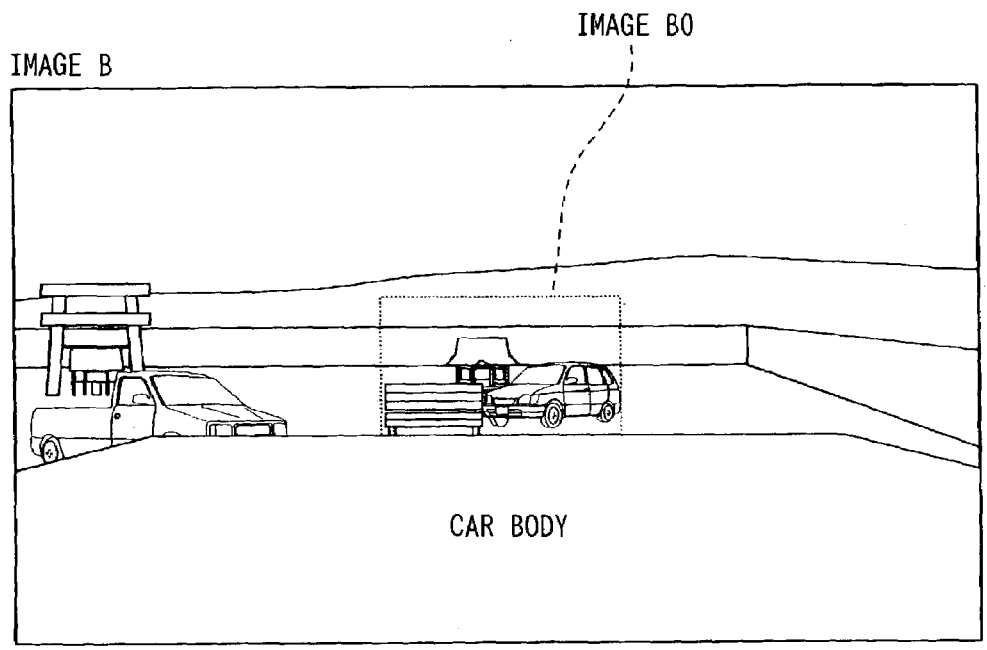
FIG. 15 is an enlarged view of a processed image shown in FIG. 6.
Figure 16:
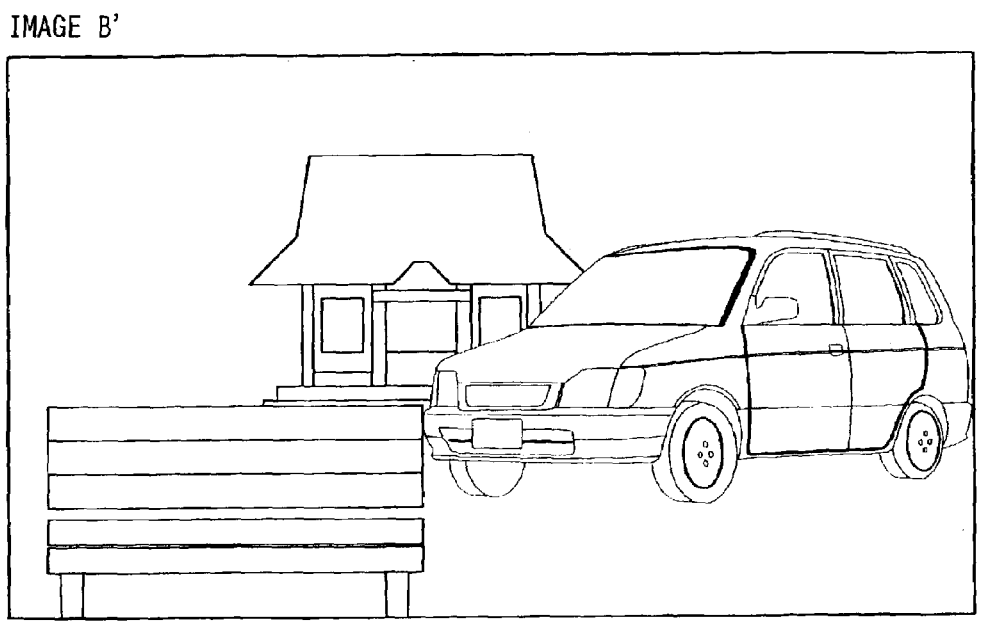
FIG. 16 is an enlarged view of a processed image shown in FIG. 6.
Figure 17:
FIG. 17 is an enlarged view of a processed image shown in FIG. 6.
Figure 18:
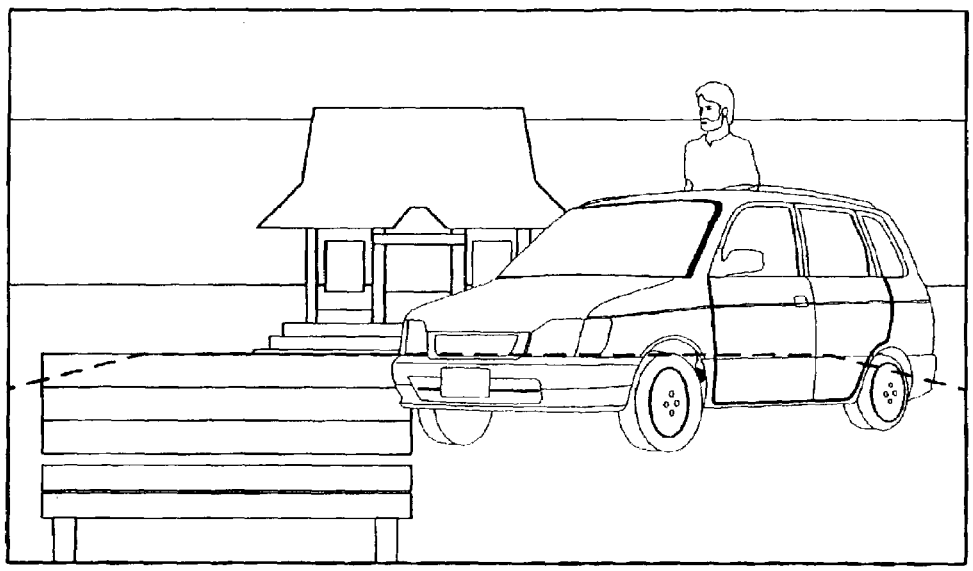
FIG. 18 is an enlarged view of a processed image shown in FIG. 6.
Figure 19:
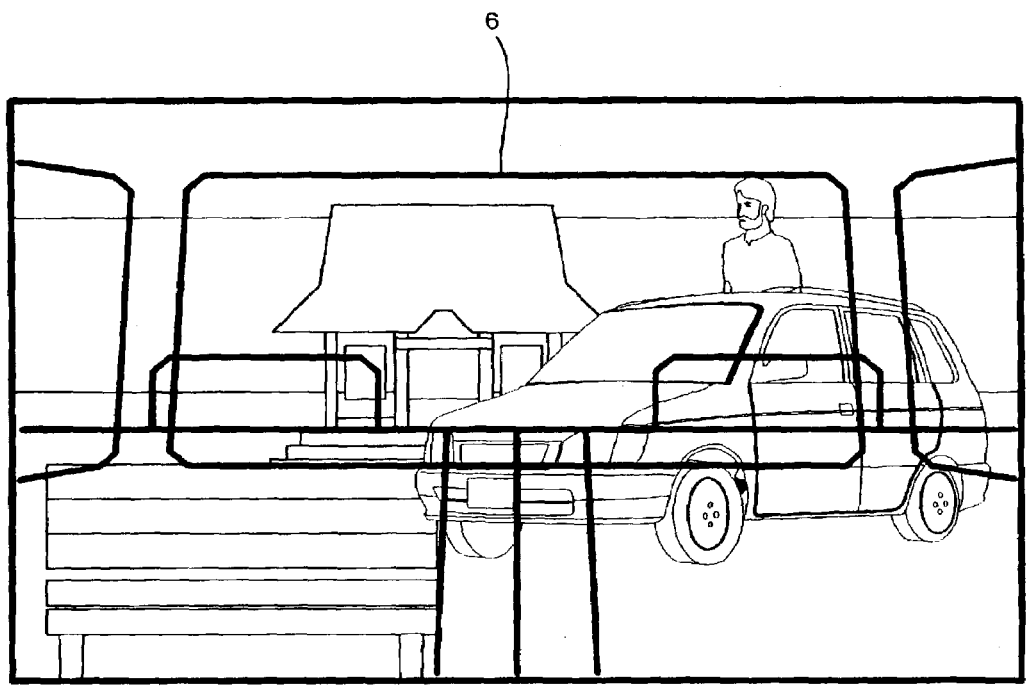
FIG. 19 is an enlarged view of a processed image shown in FIG. 6.

Since the scenery seen from the driver's viewpoint and the image A are the same images, a part B0 in the read image B is cut (FIG. 15). The image B0 is enlarged relative to the image A (so that the size of a subject becomes the same as that in the image A) to generate an image B' (FIG. 16) (step S303).

Magnification in enlargement-processing the image can be determined, for example, by the following methods. One is a method of using magnification which is determined based on experiences such as experiments. For example, magnification of enlargement/scale-down is decided according to the moving distance while an angle of view remains as it is. The relationship between the moving distance of the viewpoint of the camera and the magnification is shown in Table 1.

TABLE 1

| moving distance of camera's viewpoint (m) | 05 | 10 | 15 | 20 | 25 | 30 | 35 |
|---|---|---|---|---|---|---|---|
| magnification | 11 | 12 | 13 | 14 | 15 | 16 | 17 |

Another method is to set characteristic areas for the image A (the current image) and the image B' (the past image) respectively. As the areas, regions are selected where contrast and a change in hue and the like in the image are remarkable and objects thereof are easily specified. The images set as the characteristic areas need to capture the same objects in the image A and the image B' respectively. Then, the images are corrected so that the objects displayed in the characteristic areas have the same size.

Still another method is to determine the magnification based on a fixed value such as a focal length of the camera, the distance to an assumed object, and the like. For example, when moving distance of the camera is defined as D and the fixed value is defined as L, the magnification is {(D+L)/L}. The above-described steps S302 and S303 constitute a car body image region obtaining means.

After step S303, an image A' (FIG. 17) from which a part where the car body is displayed as the blind spot region in the image A is removed is generated based on the car body data stored in the ROM 122 (step S304). As a method of specifying the part where the car body is displayed, the part is specified by the car body data stored in the ROM 122 (a car body region specifying means). The image A' and the image B' are combined to generate a dummy transparent image A'+B' (FIG. 18) (step S305). The dummy transparent image A'+B' is in a state in which, in a car body part cut and removed from the image A, a corresponding part of the image B' is pasted. The generated dummy transparent image is tentatively stored in the dummy transparent image data memory 163 (step S306). The above-described steps S301 to S305 constitute an image combination means. A dummy transparent image processing step S105 is completed as stated above, and the system returns to a main routine and goes to the next step.

The dummy transparent image A'+B' is read from the dummy transparent image data memory 163, and a contour line 6 of a portion symbolizing the vehicle seen from the driver's viewpoint is combined to generate a final combination image (FIG. 19) (step S106). The contour line can be a contour line of a portion symbolizing the car body, and may be a contour line including, for example, at least one of the car body, a bumper, a light, a wiper, an instrument panel, the steering wheel, the mirror, a tire, a seat and a form of the window.

Particularly, the contour line is desirably a contour line of a portion positioned in the outermost of the car body, or a contour line of a portion which is simultaneously recognized in the sight together with the outside scenery every time when the driver looks outside the car body. The portion positioned in the outermost of the car body includes the car body, the bumper, the light, the tire, an outside mirror, and the like, and the portion simultaneously recognized in the sight includes the wiper, the instrument panel, the steering wheel, the rear-view mirror, the seat, the form of the window, and the like. To combine the contour line of the portion positioned in the outermost of the car body has an effect of facilitating the understanding of distance between the car body and an outside obstacle. Further, when the contour line of the portion recognized in the sight is combined, an image closely analogous to the sight in operating the vehicle recognizing by eyes is obtained and therefore the driver can understand the relationship in position between the outside obstacle and the vehicle by the same intuition as that he/she has previously mastered. The above-described step S106 constitutes a car body form image combination means.

Data of the contour line is created based on the data of the car body to which the system of the present invention is installed, and stored in the storage device 16, the ROM 122, and the like in advance.

The final combination image generated in step S106 is outputted to the image display device 14 (step S107).

It is judged whether there is timing for completing the system (step S108). For example, when the image processing system of the present invention is switched off or the display of the image display device 14 is changed, the system is stopped. Further, when the ignition is switched off, which means that the vehicle is parked, the system is similarly stopped.

Furthermore, when the vehicle speed reaches or exceeds the predetermined speed, the vehicle is in a normal traveling state, which means that there is no more need to recognize the blind spot region near the vehicle as needed in parking the vehicle in the garage and the like, and the system is stopped. Accordingly, in a case of Yes in step S108, the flow chart of the image processing is completed (step S111).

If there is no timing for completing the system (step S108: No), it is judged whether the variables initialized in step S101 exceed the set values (step S109). The variables indicate the distance, time, a remaining amount of a memory, and the like and, when these values exceed the predetermined set values, the system returns to a position where data write is started and overwrites new image data on earlier data (step S110). Here, the system returns to step S101, where the variables for monitoring the set values are initialized.

When the variables do not exceed the set values in step S109, the system returns to step S102.

The operations explained above are performed when the camera 13 is provided in a position apart from the viewpoint position of the driver, but the camera 13 may be provided near the viewpoint position. In this case, in the flow chart shown in FIG. 3, processing except the viewpoint conversion processing in step S103 is performed. In other words, since viewpoint conversion is not necessary, the viewpoint conversion processing is not performed. FIG. 20 is a flow diagram showing a procedure of image processing. The part B0 corresponding to the current image A is cut from the past image B and enlarged to create the image B'. Further, the blind spot part where the inside of the vehicle is displayed is cut from the current image A to generate the image A', and the image B' and the image A' are combined to generate the image A'+B'. Adding the contour line 6 to this image, the final combination image is generated.

In this case, the system may have the constitution in which the contour line of the car body to be combined is detected from the imaged image A. When thus constituted, since an actual state of the car body is displayed in the image, the relationship between an outside scenery and the car body can be understood more realistically. For example, when the vehicle rolls backward, an ornament and the like put on the dashboard of the rear window are displayed in the image, which can bring the image closer to the view actually seen by eyes.

As a method of detecting the contour line, a known image processing method can be used and, for example, processing can be performed in which processing of emphasizing a contour is performed by Sobel filter processing, Laplacian filter processing, or the like to extract only the contour line. Further, not limited to the constitution in which only the contour line is combined, the image in which the car body and the inside of the vehicle are displayed (the image of the part generating the blind spot) may be made to be semi-transparent and combined.

Such processing for detecting the contour line 6 is performed, for example, between step S105 and step S106, and functions as a contour line detecting means.

Figure 21:
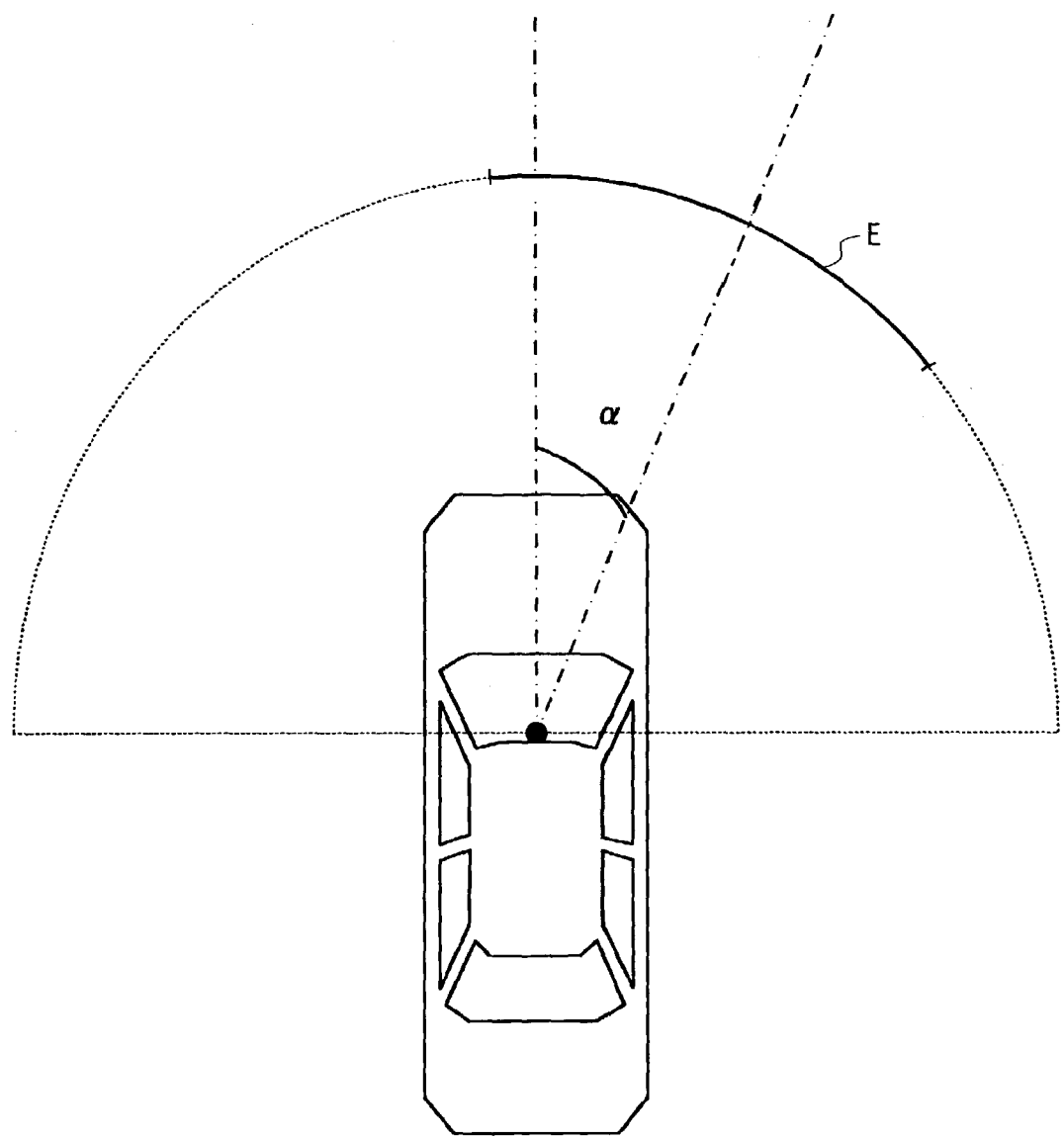
FIG. 21 is a plan view showing the sight of a camera when a wide-angle lens camera is used.

Next, the camera 13 can use a wide-angle lens. FIG. 21 is a view showing a range of the sight of the camera when the wide-angle lens is used. When the wide-angle lens is used, high distortion occurs in an image due to its lens characteristics, and therefore a step of conversion-processing the wide-angle image to a normal image for correcting the distortion based on the lens characteristics is performed between step S206 and step S207 described above. Further, the system can also have the constitution in which the region cut as the outside image is also changed according to the steering angle detected by the rudder angle sensor 151.

For example, when a rudder angle of α° to the right is detected, a position E to cut an image is moved to the right according to the angle.

The operations explained above are an example performed in rolling the vehicle backward, but the similar operations are also performed in moving the vehicle forward. When the vehicle moves forward, the camera is preferably provided in a substantially central part of the dashboard, in a position of a joint of the rear-view mirror, and the like.

Incidentally, it is preferable if the system has the constitution in which a distance-measuring sensor for measuring the distance between the outside obstacle and the car body by ultrasonic waves or the like is provided to the car body so as to measure the distance to the outside obstacle as well as to display the combination image, which makes it further easier to have a perception of distance. For example, the system can have the constitution in which, when the distance to the obstacle detected by an ultrasonic wave sensor is equal to or shorter than a predetermined distance, an alarm is issued as an audio signal, a red silhouette is displayed on the screen as a visual signal, and the like.

(Second Embodiment of the Invention)

Hereinafter a second embodiment of the present invention will be explained in detail with reference to the attached drawings.

Figure 22:
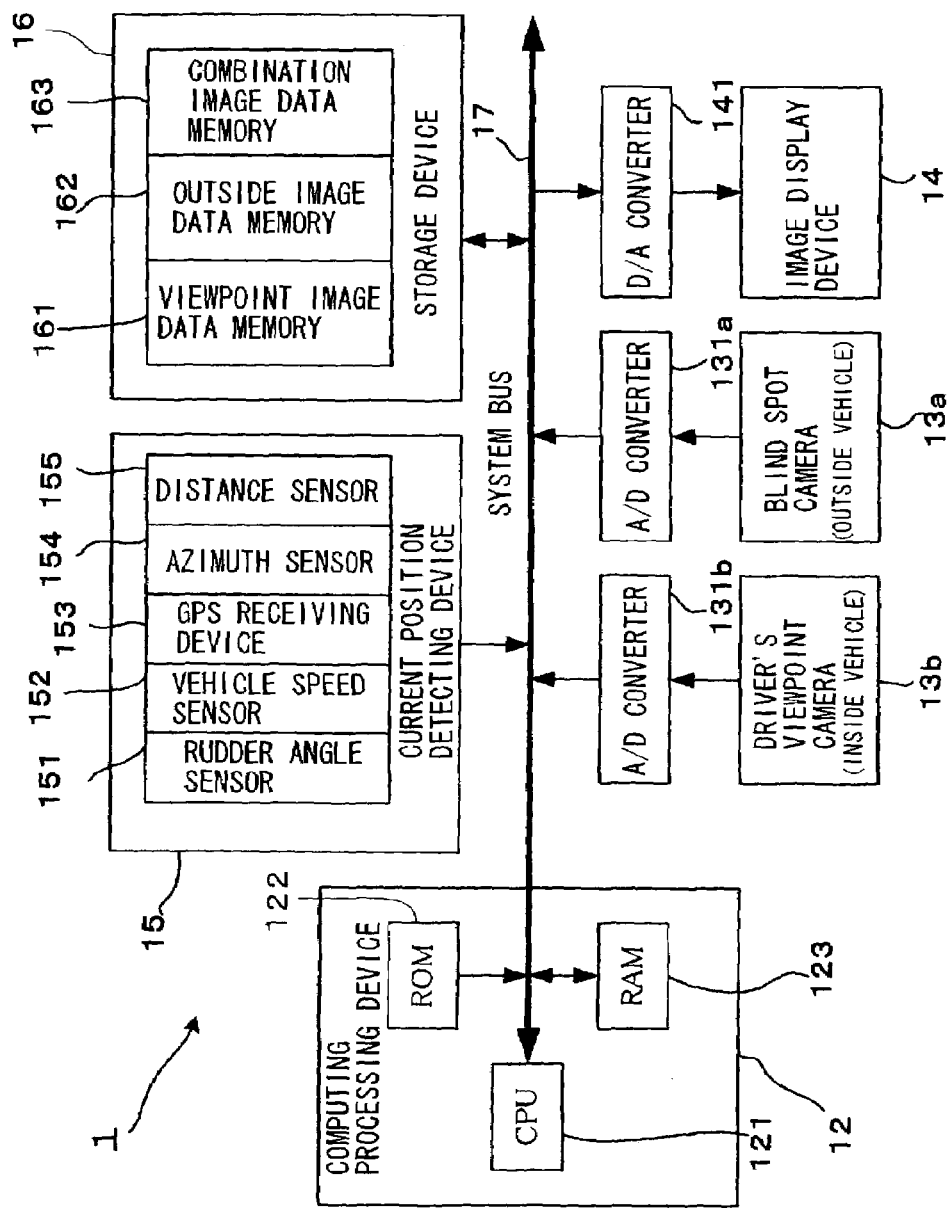
FIG. 22 is a block diagram showing a configuration of an image processing system in a second embodiment of the present invention.

FIG. 22 is a block diagram showing a configuration of an image processing system 1 in the second embodiment. The image processing system 1 has a computing processing device 12 for performing image processing, a blind spot camera 13a as a different imaging means, a driver's viewpoint camera 13b as an imaging means, an image display device 14 as a display means for displaying an image, a current position detecting device 15, and a storage device 16 as an image storage means, and these devices are connected to each other via a system bus 17.

The blind spot camera 13a uses a wide-angle lens, and a fish-eye lens is used in the second embodiment. The blind spot camera 13a is provided, for example, outside a motor vehicle and mounted toward a moving direction of the vehicle. When the camera obtains an image of the rear of the vehicle in rolling backward, it can be mounted, for example, on a center part of a rear trunk room or on a rear window in a case of a hatchback-type vehicle, toward the outside. In the second embodiment, the blind spot camera 13a is arranged in a center position of the rear trunk room. The driver's viewpoint camera 13b is provided, for example, inside the motor vehicle and in a position of the driver's viewpoint. In the second embodiment, the driver's viewpoint camera 13b is arranged in a position where a rear-view mirror is mounted.

The blind spot camera 13a and the driver's viewpoint camera 13b are connected to the system bus 17 via A/D converters 131a and 131b respectively. Image signals outputted from the blind spot camera 13a and the driver's viewpoint camera 13b are converted to digital signals by the A/D converters 131a and 131b respectively. When the connected blind spot camera 13a and driver's viewpoint camera 13b are capable of outputting the digital signals, the A/D converters 131a and 131b are not needed. The blind spot camera 13a and the driver's viewpoint camera 13b include a camera arranged toward the front of the vehicle and a camera arranged toward the rear of the vehicle. In the explanations below, the blind spot camera 13a installed in the rear and the driver's viewpoint camera 13b will be explained as an example, which are used in moving backward when the sight is limited maximally.

The current position detection device 15 has, similarly to the first embodiment, a rudder angle sensor 151, a vehicle speed sensor 152, a GPS receiving device 153, an azimuth sensor 154, and a distance sensor 155. These sensors are the same as those in the aforesaid first embodiment, and detailed explanations thereof will be omitted.

The storage device 16 is a device for storing images imaged by the blind spot camera 13a and the driver's viewpoint camera 13b, in which the images outputted from the blind spot camera 13a and the driver's viewpoint camera 13b are continuously stored, and has an outside image data memory 162 for storing an image obtained by the blind spot camera 13a as the different imaging means, a viewpoint image data memory 161 for storing a viewpoint image obtained by the driver's viewpoint camera 13b, and a combination image data memory 163 for storing an image in which the viewpoint image and a converted outside image generated by the image data memory 162 are combined.

The image display device 14 is constituted, for example, of a liquid crystal display or the like, on which a combination image stored in the combination image data memory 163 is displayed. Data transmitted to the image display device 14 is converted to an analog signal via a D/A converter 141. When the image display device 14 is capable of receiving a digital signal, the D/A converter is not needed.

The computing processing device 12 has a central processing unit (CPU) 121, a read-only memory (ROM) 122, and a random-access memory (RAM) 123. The CPU 121 performs various computing processing such as obtaining information on the moving distance and an orientation of the vehicle obtained by the current position detecting device 15, and obtaining viewpoint image data and outside image data from the storage device 16 so as to generate combination image data from these data.

The ROM 122 stores therein, for example, software for the CPU 121 to perform image processing and car body data such as image data of a contour line of the vehicle, and also functions as a car body data storage means. The RAM 123 is used, for example, as a working area.

Figure 23:
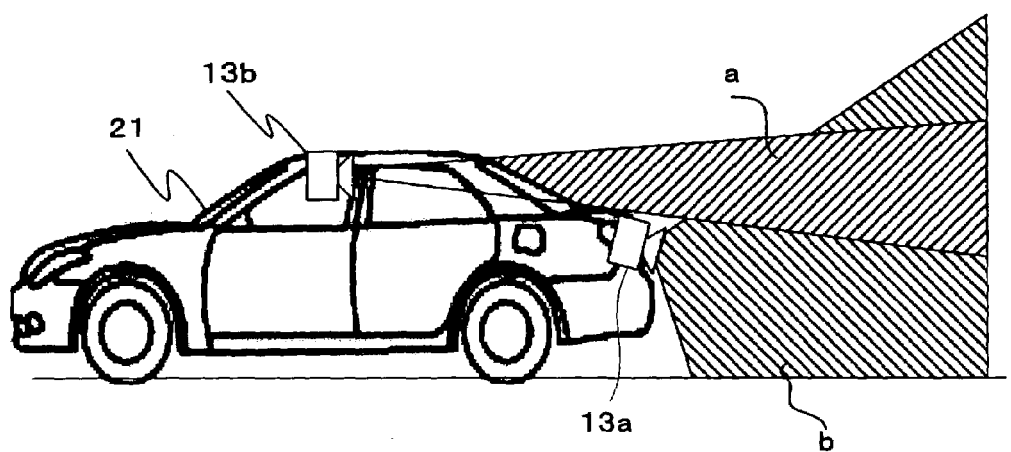
FIG. 23 is a side view of a vehicle on which the image processing system in the second embodiment of the present invention is mounted.

The image processing system of the present invention operates as follows. FIG. 23 is a general side view of a vehicle 21 on which the image processing system of the present invention is mounted. The driver's viewpoint camera 13b as the imaging means for imaging the rear of the vehicle is arranged inside the vehicle, and the rear scenery of the vehicle is displayed in a part of a screen thereof, for example, via a rear window (a visible region a). A car body is displayed in the rest region on the screen, that is, a backseat and other interior are displayed on the screen. The part in which the car body is displayed becomes a blind spot and, for example, a region in the rear of the vehicle close to the vehicle, regions close to left and right sides of the rear part of the vehicle, and the like become blind spot regions hidden by the car body.

On the other hand, the blind spot camera 13a as the different imaging means images an image of the rear of the vehicle 21. In this image, the rear scenery of the vehicle is displayed (a region b) including objects in the blind spot region in the image imaged by the driver's viewpoint camera 13b (the viewpoint image). For example, the region in the rear of the vehicle close to the vehicle, the regions close to the left and right sides of the rear part of the vehicle, and the like are included and, further, objects in the visible region displayed in the viewpoint image are also captured in the image (in other words, the region b includes the region a).

It should noted that, since the blind spot camera 13a is not provided in the driver's viewpoint position, an outside image is different from the view visible from the driver's viewpoint position.

The outside image is image-processed to an image whose imaging position is converted to the viewpoint position (the position of the driver's viewpoint camera 13b), and the processed image is combined with the image of the driver's viewpoint camera 13b (the viewpoint image) so that the blind spot region is filled with the outside image. As a result, an image at the driver's viewpoint position without the blind spot region is obtained.

The most preferable position of installing the driver's viewpoint camera 13b is the viewpoint portion of the driver, but it may be installed in a position near the viewpoint position. For example, besides the position at the rear-view mirror, a position near the center of a dashboard, a shoulder part of a seat, and the like are possible. When the camera is not installed in the viewpoint position, it is also suitable that viewpoint conversion processing is performed based on car body data previously stored so as to process the image to an image seen from the viewpoint position.

The operation of the image processing system 1 of the present invention as configured above will be explained. FIG. 24, FIG. 25, and FIG. 26 are flow charts showing the operation of the computing processing device 12.

When a power supply switch is turned on by the ON-operation of an ignition switch, processing is started. Other than this timing, the switch may also be turned on at the timing when a shift lever is set in a D position, or in an R position in a case of displaying a rear image in rolling backward.

Next, initialization processing is performed (step S101). Specifically, data stored in the storage device 16 is searched so that image data and the like can be written in a storage region, and if there is no storable region, preparation for enabling data, which will be next obtained, to be overwritten is made as well as preparation for writing data is made such as erasing data which will not be used in the future, and so on, with reference to the distance, time, and the like stored together with the image data. For example, variables and the like for monitoring set values which are for judging whether data of the images stored in the viewpoint image data memory 161, the outside image data memory 162, and the like is to be updated are initialized.

Subsequently, it is judged whether the vehicle speed exceeds a predetermined set speed (step S102). Since the image processing system is used for recognizing the periphery of the vehicle in the second embodiment, that is, it is used in moving the vehicle sideways, in parking the vehicle in a garage, and the like, it is judged that the image processing is not needed when the vehicle speed is high. Therefore, when the vehicle speed exceeds the set speed, step S102 is repeated again. This set speed may be changeable as necessary. When the vehicle speed does not exceed the set speed, it is judged that image processing is needed and the system goes to the next step in order to perform image processing where an inside image processing routine (step S103) is started.

FIG. 25 is a flow chart showing the inside image processing routine. FIG. 27 is a flow diagram showing a procedure of image processing, and image processing contents will be explained below with reference to this drawing.

In the inside image processing routine (step S103), viewpoint images imaged at the viewpoint position by the driver's viewpoint camera 13b are obtained (step S201).

The obtained images are tentatively stored in the viewpoint image data memory 161 (step S204). A viewpoint image B0 is read from the viewpoint image data memory 161, and a blind spot region, that is, a part in which the car body is displayed, is cut from the image to generate a visible region image B1 (step S205). The step S205 constitutes a car body region specifying means. In the cutting processing, processing of extracting a contour of the part in which the inside of the vehicle is displayed from an initially-obtained viewpoint image (a contour extracting step). A known image processing method can be used as a method for detecting the contour line and, for example, processing can be performed in which processing of emphasizing the contour is performed by Sobel filter processing, Laplacian filter processing, or the like to extract only the contour line. Then, a part in which the outside of the vehicle is displayed is extracted or the part in which the inside of the vehicle is displayed is deleted with the extracted contour line as a demarcation line so that processing of cutting the blind spot region can be performed. The contour extracting step constitutes a contour line detecting means.

Further, in detecting the contour line, judgment may be made from the car body data as described in the first embodiment.

Following the inside image processing routine (step S103), an outside image processing routine (step S104) is started. FIG. 26 is a flow chart showing the outside image processing routine.

In the outside image processing routine (step S104), outside images imaged by the blind spot camera 13a are obtained (step S301).

The obtained images are tentatively stored in the outside image data memory 162 (step S304). An image A0 is read from the outside image data memory 162, and image processing is performed. Since the image A0 is a fish-eye image when the blind spot camera 13a uses the fish-eye lens, an image portion a0 to be used later is cut from the image A0 and, because the cut image a0 has high distortion due to lens characteristics of the fish-eye lens, normal image conversion processing for correcting the distortion based on the lens characteristics is performed to the cut image a0 (step S305) so that an image A1 is obtained (a car body image region obtaining means). Then, the blind spot camera 13a has not imaged the image at the driver's viewpoint position, and therefore processing of converting the imaging position to the driver's viewpoint position is performed (step S306). Firstly, affine transformation processing is performed in order to align the height of the imaging position.

Secondly, the image size of the image A1 is adjusted under a predetermined magnification in order to align it to the size of the image by the driver's viewpoint camera 13b so as to obtain a converted outside image A2. Specifically, characteristic areas are set for the image B1 and the image A1 respectively. As the areas, regions are selected where contrast and a change in hue and the like in the images are remarkable and objects thereof are easily specified. The images set as the characteristic areas need to capture the same objects in the image A1 and the image B1 respectively. Then, image conversion is performed (the image A1 is enlarged or scaled down) so that the objects displayed in the characteristic areas have the same size. The step S104 explained above constitutes an imaging position converting means.

As in the aforesaid first embodiment, the magnification can be determined based on the fixed value such as the focal length of the camera, the distance to the assumed object, and the like.

When the processing for the inside image and the outside image (steps S103 and S104) is completed, image combination processing (step S105) is then performed. In this processing, the image B1 generated in step S103 and the image A2 generated in step S104 are overlaid to generate a combination image B1+A2. As a result, the outside image A2 is added into the blind spot region in the viewpoint image B1 and an image can be generated which seems as if the outside is imaged by penetrating the car body. This step S105 constitutes an image creating means.

Further, a contour line 6 is added to the generated combination image B1+A2 so that a final combination image AB to be displayed is generated (step S106). The generated combination image AB is stored in the combination image data memory 163. The step S106 constitutes a car body form image combination means.

The contour line 6 can be the contour line of the portion symbolizing the car body, and may be the contour line including, for example, at least one of the car body, the bumper, the light, the wiper, the instrument panel, the steering wheel, the mirror, the tire, the seat and the form of the window.

Particularly, the contour line is desirably the contour line of the portion positioned in the outermost of the car body, or the contour line of the portion which is simultaneously recognized in the sight together with the outside scenery every time when the driver looks outside the car body. The portion positioned in the outermost of the car body includes the car body, the bumper, the light, the tire, the outside mirror, and the like, and the portion simultaneously recognized in the sight includes the wiper, the instrument panel, the steering wheel, the rear-view mirror, the seat, the form of the window, and the like. To combine the contour line of the portion positioned in the outermost of the car body has the effect of facilitating the understanding of distance between the car body and the outside obstacle. Further, when the contour line of the portion recognized in the sight is combined, the image closely analogous to the sight in operating the vehicle recognizing by eyes is obtained and therefore the driver can understand the relationship in position between the outside obstacle and the vehicle by the same intuition as that he/she has previously mastered.

Data of the contour line is created based on the data of the car body to which the system of the present invention is installed, and stored in the storage device 16, the ROM 122, and the like in advance. Alternatively, the contour line extracted in step S205 may be combined. In this case, since an actual state of the car body is displayed in the image, the relationship between an outside state and the car body can be understood more realistically. For example, when the vehicle rolls backward, the ornament and the like put on the dashboard of the rear window are displayed in the image, which can bring the image closer to the view actually seen by eyes. Further, not limited to the constitution in which only the contour line is combined, the part of the imaged image in which the car body and the inside of the vehicle are displayed (the image of the part generating the blind spot) may be made to be semitransparent and combined.

Next, the final combination image AB is outputted to the image display device (step S109).

It is judged whether there is timing for completing the system (step S110). For example, when the image processing system of the present invention is switched off or the display of the image display device 14 is changed, the system is stopped. Accordingly, in a case of Yes in step S110, the flow chart of the image processing is completed (step S113).

If there is no timing for completing the system (step S110: No), it is judged whether the variables initialized in step S101 exceed the set values (step S111). The variables indicate the distance, time, a remaining amount of a memory, and the like and, when these values exceed the predetermined set values, the system returns to a position where data write is started and overwrites new image data on earlier data (step S112). Here, the system returns to step S101, where the variables for monitoring the set values are initialized. When the variables do not exceed the set values in step S111, the system returns to step S102.

According to the embodiment as explained above, the image closer to the view in the sight is obtained when the outside of the vehicle is seen from the viewpoint position, and therefore the image matching with the previous perception of the driver can be provided, which facilitates steering of the vehicle. Further, the regions which cannot be recognized because of being hidden by the vehicle are also displayed in the image, which makes it further easier to recognize the periphery of the car vehicle. Furthermore, since the contour line symbolizing the position and the size of the vehicle is simultaneously displayed on the screen, the distance and the relationship in position between the obstacle around the vehicle and the vehicle can be understood easily, which further facilitates driving operation.

Other than the constitution explained above, the system may have the constitution in which the image A2 which is the viewpoint-converted outside image is used as a display image and the contour line 6 is combined with the image. In other words, the system can also have the constitution in which the outside image whose viewpoint has been converted to the viewpoint position by the imaging position converting means is displayed on the display means as it is. In this case, step S103 and step S105 are omitted. Further, since combination processing of the mage is not needed, computing processing in the computing processing device 12 is reduced. The operations explained above are performed in rolling the vehicle backward, but the similar operations are performed in moving the vehicle forward.

Figure 28:
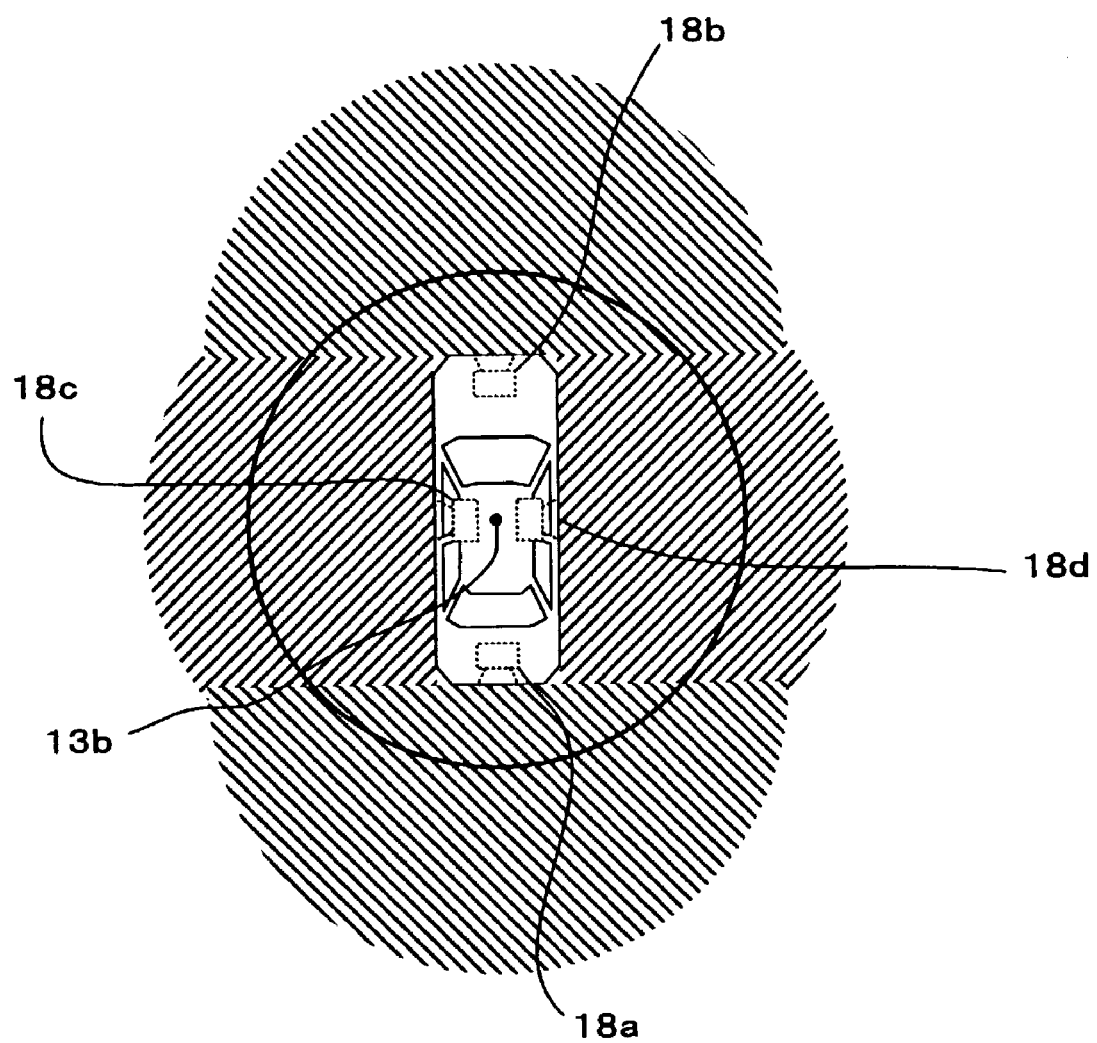
FIG. 28 is a plan view showing the sight of cameras when wide-angle lens cameras are used.

Moreover, the driver's viewpoint camera 13b may also use a wide-angle lens. Using the wide-angle lens, also when the vehicle curves, not only the image of a fixed and set single direction such as simply the front or the rear is obtained but also an angle of the steering operation and a rudder angle of the front wheels are detected so as to extract an image region according to an angle of a steering direction and to perform image processing, which makes it further possible to display an image matching with the view of the driver's sight. Further, as shown in FIG. 28, the constitution can be also adopted in which blind spot cameras 18c and 18d are provided also on the sides of the vehicle to obtain images of the whole periphery of the vehicle together with a blind spot camera 18b provided in the front and a blind spot camera 18a provided in the rear. In this case, the driver's viewpoint camera 13b also uses a fish-eye lens for obtaining an image of the whole periphery and is mounted, for example, on a ceiling part in the center of the vehicle or on a ceiling part positioned directly above the seat where the driver sits.

Incidentally, it is preferable if the system has the constitution in which a distance detecting means such as a distance-measuring sensor for measuring the distance between the outside obstacle and the car body by ultrasonic waves is provided to the car body so as to measure the distance to the outside obstacle as well as to display the combination image, which makes it further easier to have a perception of distance. For example, the system can have the constitution in which, when the distance to the obstacle detected by an ultrasonic wave sensor is equal to or shorter than a predetermined distance, an alarm is issued as an audio signal, a red silhouette is displayed on the screen as a visual signal, and the like.

According to the invention described in claim 1, since the image whose imaging position has been moved to the viewpoint position is obtained, the image closer to the scenery in the sight of the driver is obtained, which makes it easier to understand the relationship in position between the vehicle and the outside obstacle in operating the vehicle. Further, the outside image without the blind spot region is obtained, and therefore anxiety about the blind spot is reduced.

According to the invention described in claim 2, since the image of the inside of the car body is combined, the image extremely close to the view in the sight of the driver is obtained.

According to the invention described in claim 3, computing processing for performing viewpoint converting processing is reduced, which improves processing performance.

According to the invention described in claim 4, if the system has the constitution in which the contour line is detected from the obtained image, the actual state of the car body is displayed with the contour line, which increases reality and makes it further easier to understand the perception of the car body received from the image.

According to the invention described in claim 5, the contour line in a form of each part of the car body is combined with the image, which makes it further easier to understand the relationship in position between the outside environment displayed on the screen and the car body.

What is claimed is:

1. An image processing system for a vehicle, comprising:
   imaging means for capturing images of an area in advance of the vehicle in the direction of movement of the vehicle;
   car body region specifying means for specifying a car body region hidden by a car body portion in an image captured by said imaging means;
   car body image region obtaining means for obtaining an image region corresponding to the car body region which would be seen if the car body portion were transparent;
   image creating means for creating an image by replacing the car body region in the image captured imaged by said imaging means with the image region obtained by said car body image region obtaining means;
   car body form image combination means for creating a combination image by further adding a contour line, of a car body form of the vehicle, to the image created by said image creating means, wherein the car body form is at least one of a car body, a bumper, a light, a wiper, an instrument panel, a steering wheel, a mirror, a tire, a seat, and a window; and
   display means for displaying the combination image.

2. The image processing system for a vehicle according to claim 1,
   wherein an image region previously imaged by said imaging means is used as the car body region which would be seen if the car body portion were transparent.

3. The image processing system for a vehicle according to claim 1, further comprising:
   vehicle speed detecting means for detecting the vehicle speed of the vehicle, wherein the combination image is displayed when the vehicle speed detected by the vehicle speed detecting means is equal to or lower than a predetermined vehicle speed.

4. The image processing system for a vehicle according to claim 1 further comprising:
moving distance detecting means for detecting the moving distance of the vehicle,
wherein the car body image region obtaining means obtains the image region corresponding to the car body region when the detected distance is equal to or longer than a predetermined distance.

5. The image processing system for a vehicle according to claim 4, further comprising:
car body data storage means for storing car body data of the vehicle,
wherein the predetermined distance is determined based on the data stored in the car body data storage means.

6. The image processing system for a vehicle according to claim 1, further comprising:
car body data storage means for storing car body data of the vehicle,
wherein said car body region specifying means specifies the car body region hidden by the car body portion based on the car body data.

7. An image processing system for a vehicle, comprising:
imaging means for capturing images of an area in advance of the vehicle in the direction of movement of the vehicle;
captured image converting means for converting the viewpoint of a captured image as if it were seen from the driver's viewpoint;
car body region specifying means for specifying a car body region hidden by a car body portion in an image captured by said imaging means;
car body image region obtaining means for obtaining an image region corresponding to the car body region which would be seen if the car body portion were transparent;
image creating means for creating an image by replacing the car body region in the image having the viewpoint which has been converted by said captured converting means;
car body form image combination means for creating a combination image by further adding a contour line, of a car body form of the vehicle, to the image created by said image creating means, wherein the car body form is at least one of a car body, a bumper, a light, a wiper, an instrument panel, a steering wheel, a mirror, a tire, a seat, and a window; and
a display means for displaying the combination image.

8. The image processing system for a vehicle according to claim 7,
wherein an image region previously imaged by said imaging means is used as the car body region which would be seen if the car body portion were transparent.

9. The image processing system for a vehicle according to claim 1, further comprising:
vehicle speed detecting means for detecting the vehicle speed of the vehicle,
wherein the combination image is displayed when the vehicle speed detected by the vehicle speed detecting means is equal to or lower than a predetermined vehicle speed.

10. The image processing system for a vehicle according to claim 7 further comprising:
moving distance detecting means for detecting the moving distance of the vehicle,
wherein said captured image converting means converts the viewpoint of the image when the moving distance detecting means detects that the vehicle has moved a distance corresponding to the distance between a position of a driver and a position in which said imaging means is installed.

11. The image processing system for a vehicle according to claim 7 further comprising:
moving distance detecting means for detecting the moving distance of the vehicle,
wherein said car body region specifying means specifies the car body region when the detected distance is equal to or longer than a predetermined distance.

12. The image processing system for a vehicle according to claim 11, further comprising:
car body data storage means for storing car body data of the vehicle,
wherein the predetermined distance is determined based on the data stored in the car body data storage means.

13. The image processing system for a vehicle according to claim 1, further comprising:
car body data storage means for storing car body data of the vehicle,
wherein said car body region specifying means specifies the car body region hidden by the car body portion based on the car body data.

14. The image processing system for a vehicle according to claim 1, further comprising:
a different imaging means arranged outside the vehicle, for capturing images in the same direction as said imaging means,
wherein an image captured by the different imaging means is used as the image which would be seen if the car body portion were transparent.

15. The image processing system for a vehicle according to claim 14,
wherein the image captured by the different imaging means is converted to an image as seen from the driver's viewpoint.

16. The image processing system for a vehicle according to claim 14,
wherein the image captured by said imaging means is converted to an image as seen from the driver's viewpoint.

17. The image processing system for a vehicle according to claim 14, further comprising:
vehicle speed detecting means for detecting the vehiclespeed,
wherein the combination image created by said image creating means is displayed when the vehicle speed detected by the vehicle speed detecting means is equal to or lower than a predetermined vehicle speed.

* * * * *

UNITED STATES PATENT AND TRADEMARK OFFICE
CERTIFICATE OF CORRECTION

PATENT NO. : 7,212,653 B2  Page 1 of 1
APPLICATION NO. : 10/314230
DATED : May 1, 2007
INVENTOR(S) : Atsushi Sato et al.

It is certified that error appears in the above-identified patent and that said Letters Patent is hereby corrected as shown below:

Column 19, line 42 (claim 7, line 17) "captured converting means" should read -- captured image converting means --.

Column 19, line 51 (claim 7, last line), "a display means" should read -- display means --.

Column 20, lines 56-57 (claim 17, lines 3 and 4) "vehiclespeed" should read -- vehicle speed --.

Signed and Sealed this

Twentieth Day of January, 2009

JON W. DUDAS
*Director of the United States Patent and Trademark Office*